(12) United States Patent
Weissman et al.

(10) Patent No.: US 11,882,584 B2
(45) Date of Patent: Jan. 23, 2024

(54) INTERFERENCE IDENTIFICATION IN C-V2X COMMUNICATION

(71) Applicant: QUALCOMM Incorporated, San Diego, CA (US)

(72) Inventors: Haim Weissman, Haifa (IL); Lior Uziel, Hod Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 220 days.

(21) Appl. No.: 17/404,969

(22) Filed: Aug. 17, 2021

(65) Prior Publication Data

US 2022/0061058 A1 Feb. 24, 2022

Related U.S. Application Data

(60) Provisional application No. 63/067,872, filed on Aug. 19, 2020.

(51) Int. Cl.
*H04W 72/541* (2023.01)
*H04W 72/0453* (2023.01)
*H04W 72/02* (2009.01)
*H04W 92/18* (2009.01)

(52) U.S. Cl.
CPC ......... *H04W 72/541* (2023.01); *H04W 72/02* (2013.01); *H04W 72/0453* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2011/0255431 A1* | 10/2011 | Wang | H04L 5/0048 370/252 |
| 2015/0124710 A1* | 5/2015 | Sun | H04L 27/0008 370/329 |
| 2016/0227427 A1* | 8/2016 | Vajapeyam | H04L 5/0048 |
| 2021/0050868 A1* | 2/2021 | Weissman | H04B 1/18 |
| 2021/0091864 A1* | 3/2021 | Weissman | H04W 52/0216 |
| 2022/0061058 A1* | 2/2022 | Weissman | H04J 11/00 |
| 2023/0112645 A1* | 4/2023 | Zarubica | H04B 17/336 455/296 |

* cited by examiner

*Primary Examiner* — Christopher T Wyllie
(74) *Attorney, Agent, or Firm* — Procopio, Cory, Hargreaves & Savitch

(57) ABSTRACT

A method of wireless communication of a wireless device in a C-V2X connection may include: determining a first WBEE of a symbol at a first bandwidth, the symbol being associated with no expected C-V2X transmissions, determining a second WBEE of the symbol at a second bandwidth, and identifying an interference based on the first WBEE and the second WBEE. The method may also include notifying an operator of the wireless device about the identified interference.

28 Claims, 13 Drawing Sheets

INTERFERENCE IDENTIFICATION IN C-V2X COMMUNICATION

CROSS REFERENCE TO RELATED APPLICATION(S)

This application claims the benefit of and priority to U.S. Provisional Application Ser. No. 63/067,872, entitled "METHODS AND APPARATUS FOR IDENTIFYING INTERFERENCE IN C-V2X COMMUNICATION" and filed on Aug. 19, 2020, which is expressly incorporated by reference herein in its entirety.

TECHNICAL FIELD

The present disclosure relates generally to communication systems, and more particularly, to a method of wireless communication with identifying interference in cellular vehicle-to-everything (V2X) (C-V2X) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be a method of wireless communication of a wireless device in a C-V2X connection may include: determining a first wide band energy estimation (WBEE) of a symbol at a first bandwidth, the symbol associated with no expected C-V2X transmissions, determining a second WBEE of the symbol at a second bandwidth, and identifying an interference based on the first WBEE and the second WBEE. The method may also include notifying an operator of the wireless device of the identified interference.

In one aspect, the first bandwidth may be 10 MHz and the second bandwidth may be 20 MHz, and the interference may be identified based on a ratio of the second WBEE to the first WBEE being substantially greater than 2. In another aspect, the first bandwidth may be 20 MHz and the second bandwidth may be 10 MHz, and the interference may be identified based on a ratio of the first WBEE to the second WBEE being substantially greater than 2. The symbol may be a symbol 13, and the symbol may correspond to a time period of 20 microseconds (µs).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
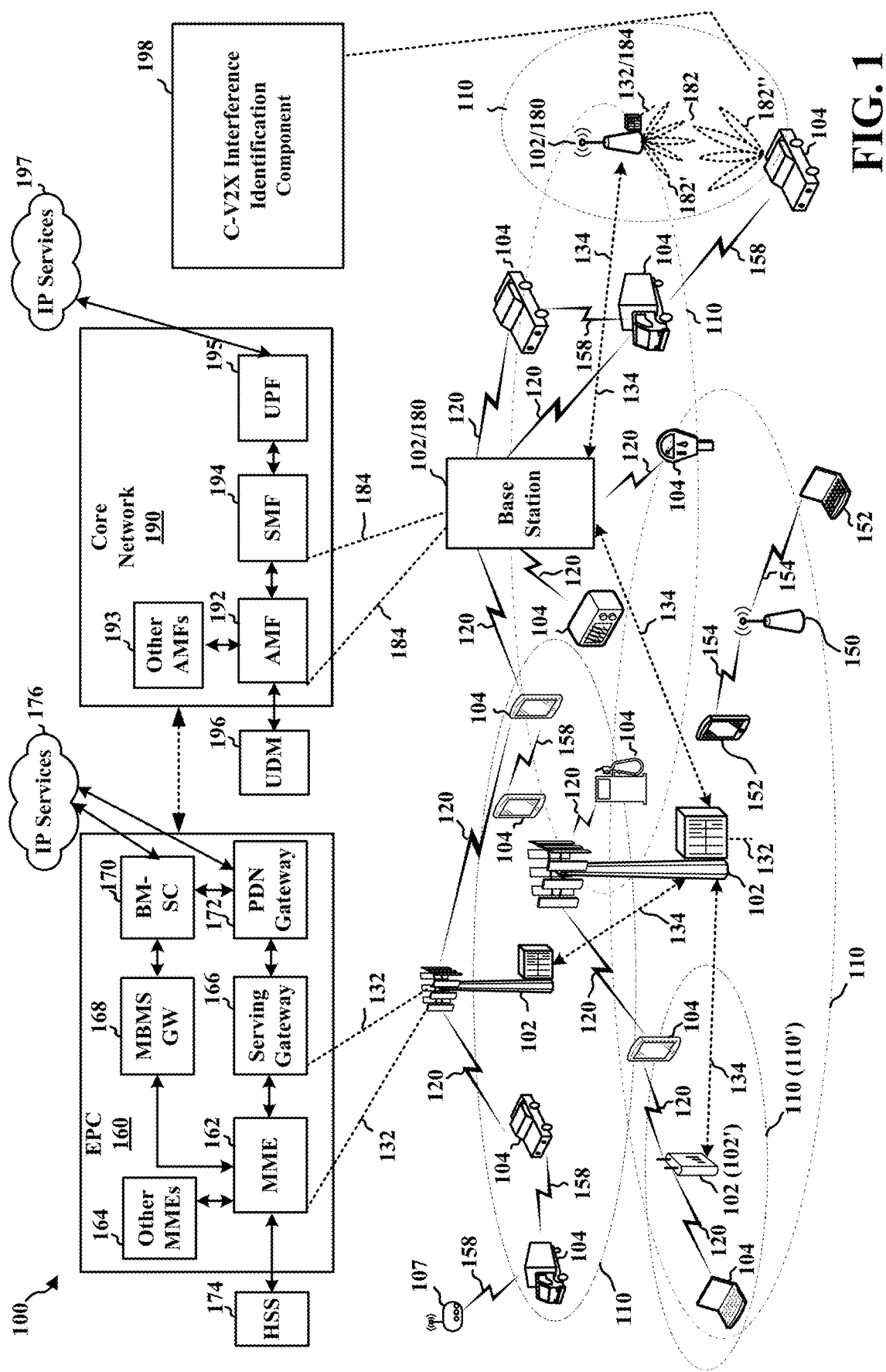
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a C-V2X interference identification component 198 configured to detect a first WBEE within a silent symbol time at a first bandwidth, the silent symbol time being associated with no expected data transmission, detect a second WBEE at a second bandwidth within the silent symbol time subsequent to the first WBEE, the second bandwidth being different from the first bandwidth and identify an interference in the silent symbol time based on the first WBEE and the second WBEE. Although the following description may be focused on 5G NR, the concepts described herein may be applicable to other similar areas, such as LTE, LTE-A, CDMA, GSM, and other wireless technologies.

Figure 2:
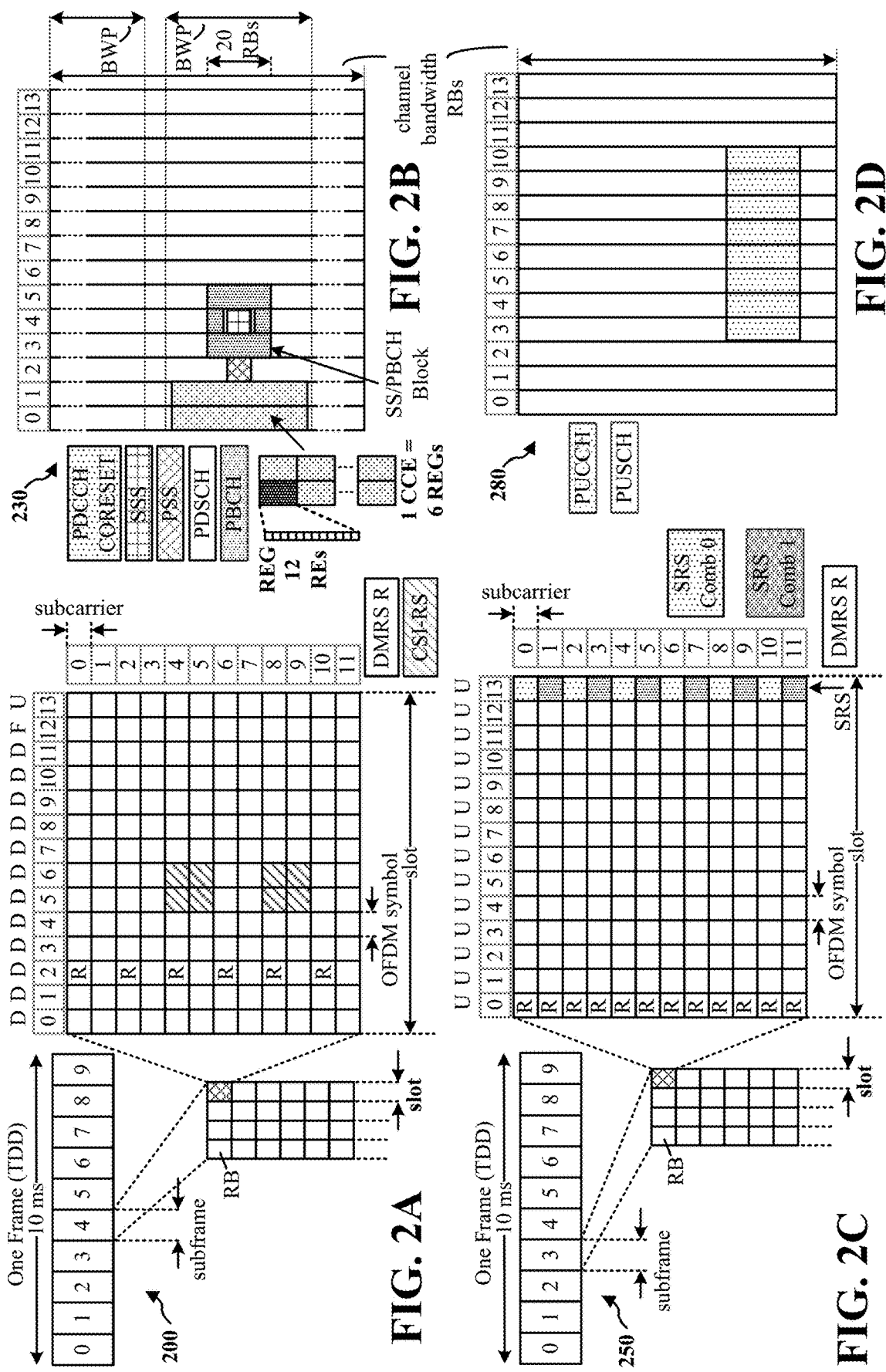
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
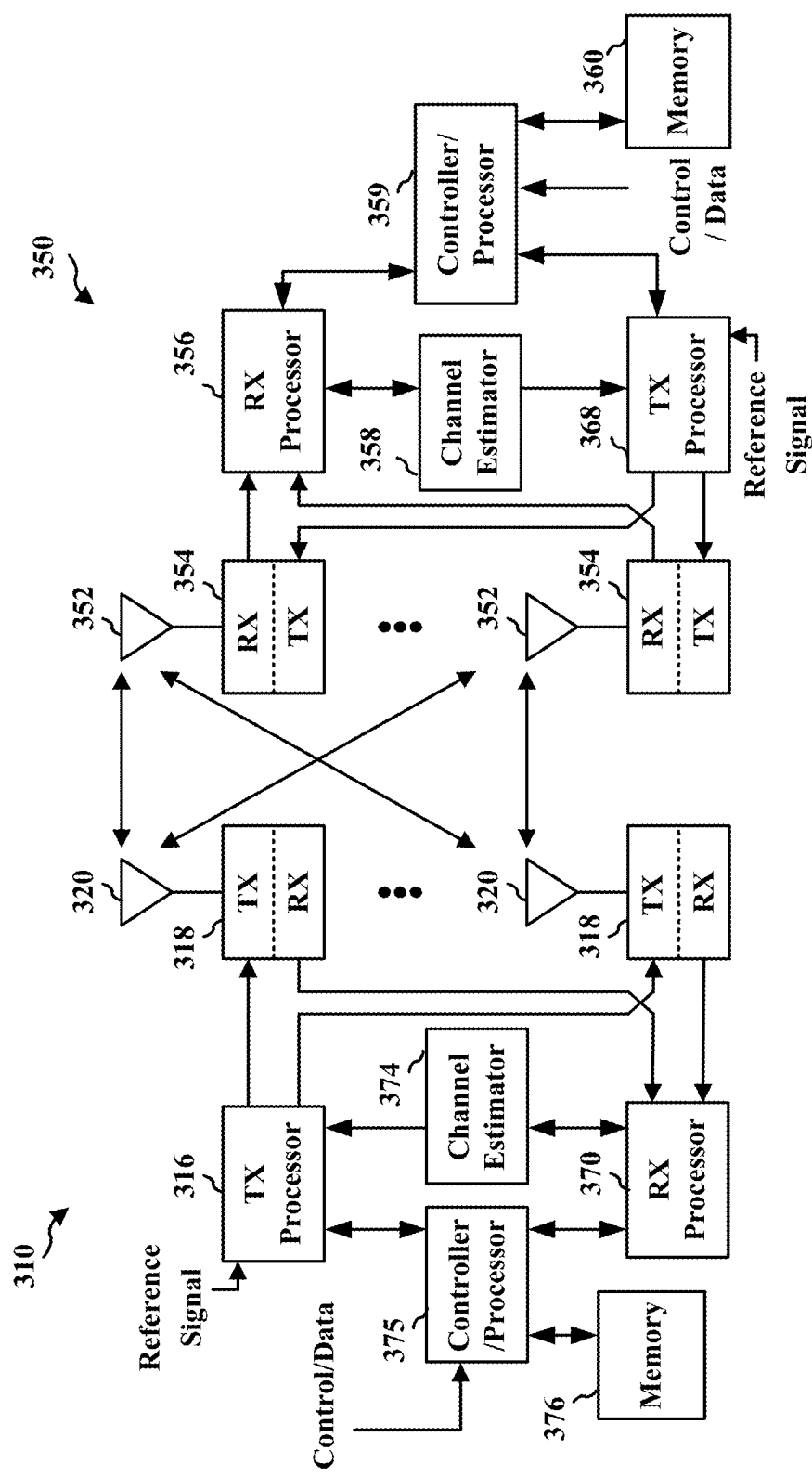
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Figure 4:
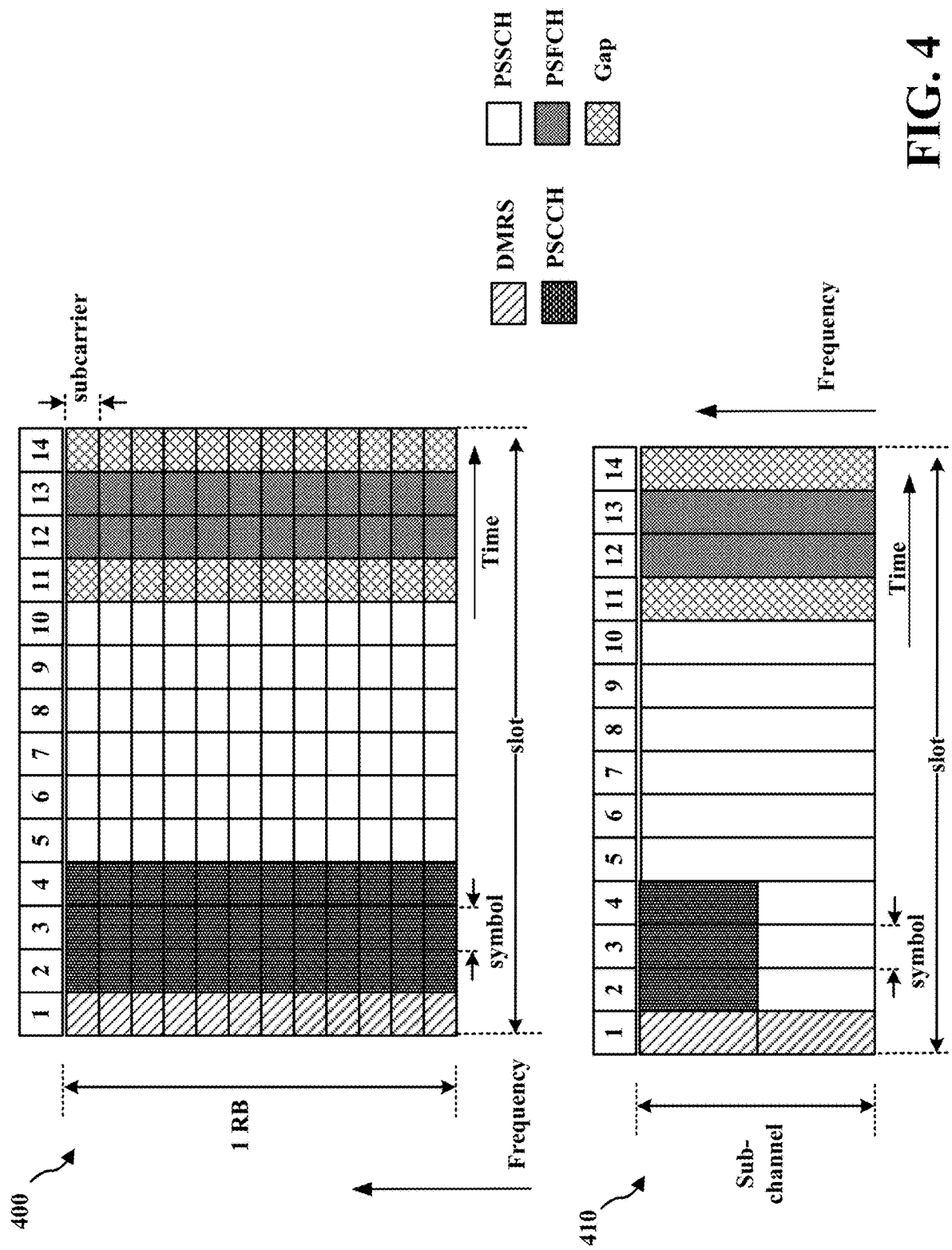
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 40, or 25 PRBs. The PSCCH may be limited to a single sub-channel. A PSCCH duration may be configured to be 2 symbols or 3 symbols, for example. A sub-channel may include 10, 15, 40, 25, 50, 75, or 100 PRBs, for example. The resources for a sidelink transmission may be selected from a resource pool including one or more sub-channels. As a non-limiting example, the resource pool may include between 1-27 sub-channels. A PSCCH size may be established for a resource pool, e.g., as between 10-100% of one sub-channel for a duration of 2 symbols or 3 symbols. The diagram 410 in FIG. 4 illustrates an example in which the PSCCH occupies about 50% of a sub-channel, as one example to illustrate the concept of a PSCCH occupying a portion of a sub-channel. The physical sidelink shared channel (PSSCH) occupies at least one sub-channel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Figure 5A:
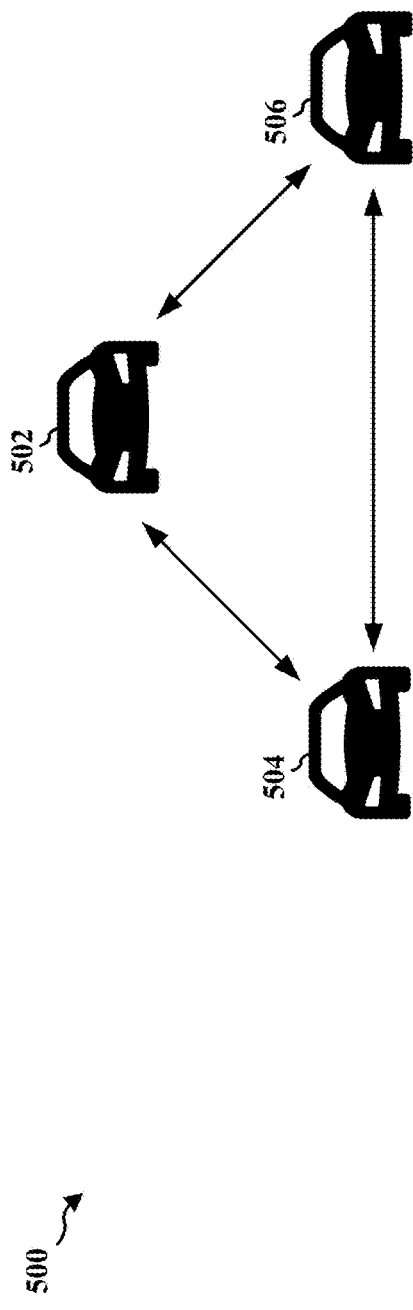
FIG. 5A illustrates a C-V2X mode-4 communication.

FIG. 5A illustrates a C-V2X mode-4 communication 500. The C-V2X communication may include vehicle-to-vehicle (V2V) communication, vehicle-to-infrastructure (V2I) communication, vehicle-to-pedestrian (V2P) communication, and/or vehicle-to-cloud (V2C) communication. A C-V2X mode-4 may operate without infrastructure support, using a specific resources pool allocation and semi-persistent scheduling (SPS) to select and reserve resources for transmission. That is, the C-V2X mode-4 communication may refer to the C-V2X communication that may configure communication between vehicle and/or other wireless devices without a configuration from a cellular infrastructure. To configure the C-V2X mode-4 communication, the sidelink control information (SCI) may be transmitted over a physical sidelink control channel (PSCCH), and the data may be transmitted over a physical sidelink shared channel (PSSCH). Accordingly, the vehicle and/or other wireless devices may autonomously select sub-channels or radio resources for their V2X data transmission.

The C-V2X mode-4 communication 500 may include a first vehicle 502, a second vehicle 504, or a third vehicle 506. The first vehicle 502, the second vehicle 504, or the third vehicle 506 may be configured to communicate with each other over the C-V2X mode-4 communication. That is, the first vehicle 502, the second vehicle 504, or the third vehicle 506 may self-manage the C-V2X mode-4 communication between the first vehicle 502, the second vehicle 504, or the third vehicle 506 through direct communications and control on PC5 interface without any network assistance from an external device, such as the cellular infrastructure.

Because the C-V2X signal may randomly vary from one subframe (SF) to another with different frequency allocations and received signal power for each SF, the signaling may be unstable over time. The C-V2X transceiver may transmit at a very low duty cycle of about 2%. For example, the C-V2X may transmit once per 100 milliseconds (ms), 200 ms, or 300 ms.

Figure 5B:
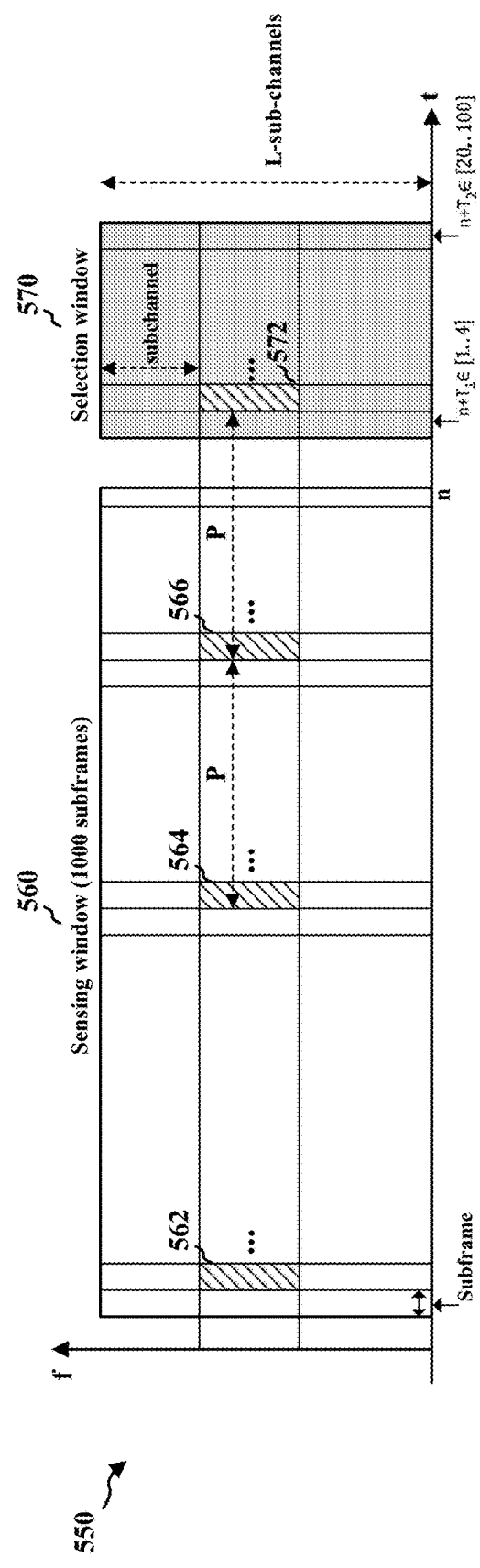
FIG. 5B illustrates semi-persistent scheduling in C-V2X communication.

FIG. 5B illustrates semi-persistent scheduling 550 in C-V2X communication. The semi-persistent scheduling 550 may include a set of radio resources having L sub-channels, including a sensing window 560 and a selection window 570. For example, the sensing window may include 1000 subframes. Here, the C-V2X device may receive a request for resource selection for transmission at n subframe, and the selection window 570 may extend from n+T$_1$ subframe to n+T$_2$ subframe. For example, T$_1$ may be 1, 2, 3, or 4 subframes, and T$_2$ may be 20 to 100 subframes.

The C-V2X device may select a set of radio resources in the selection window 570 based on the sensing window 560. The C-V2X device may sense or monitor during the sensing window 560, and select a set of radio resources (e.g., PRBs of a subframe and/or a sub-channel) in the selection window 570 to schedule and transmit the C-V2X mode-4 communication to the other C-V2X devices. That is, during the sensing window, the C-V2X device may perform channel busy ratio (CBR) measurements to estimate the portion of sub-channels of which a sub-channel received signal strength indicator (RSSI) (S-RSSI) exceeds a pre-defined threshold.

For example, the semi-persistent scheduling 550 of FIG. 5B illustrates that the C-V2X device may measure the S-RSSI of the PRBs 562, 564, and 566 at the periodicity P and the C-V2X device may estimate whether to select the PRB 572 for transmission based on the measurement of the S-RSSI of the PRBs 562, 564, and 566 in the sensing window corresponding to the PRB 572 in the selection window. According to the CBR measurements, a portion of the sub-channels may be selected and used for transmission (also, refer to FIG. 6). The accuracy of the S-RSSI may be associated with proper operation in the C-V2X system.

Figure 6:
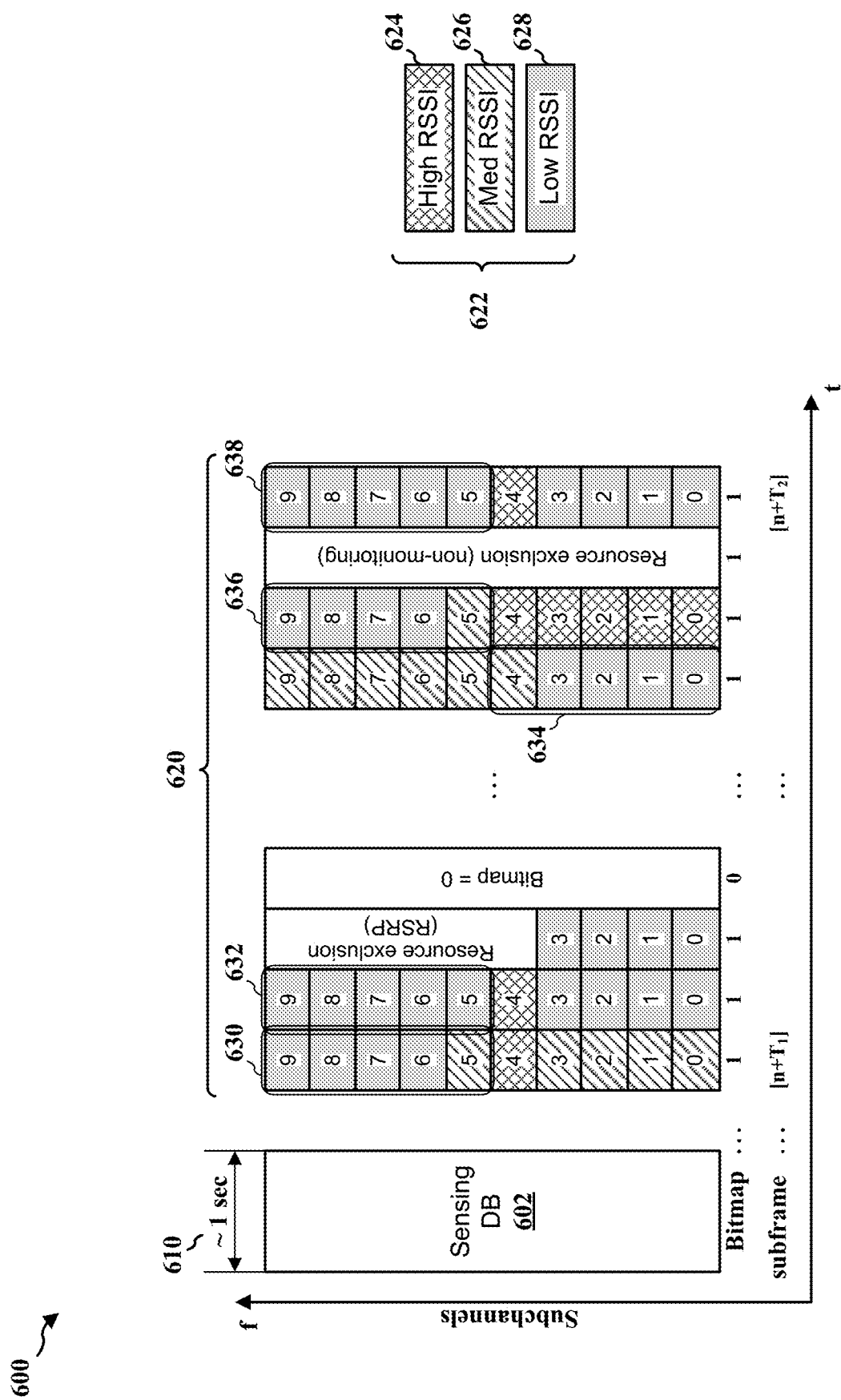
FIG. 6 illustrates sensing and resource selection for transmission in C-V2X.

FIG. 6 illustrates sensing and resource selection 600 for transmission in C-V2X. The sensing and resource selection 600 may include a sensing window 610 and a selection window 620. The sensing window 610 may include sensing data blocks 602. In one aspect, a transmission candidate including a set of radio resources may be selected in the selection window 620 based on the S-RSSI measured from the sensing window 610. For example, the selection of the transmission candidate including the set of radio resources in the selection window 620 may be based on the average of the S-RSSI measured during the sensing window 610.

For example, the C-V2X device may receive, from one or more higher layers, a request to select transmission candidates in the selection window 620, and the C-V2X device may randomly select transmission resources among the transmission resources in the selection window 620 based on the average S-RSSI measurement of each sub-channel per subframe.

In response to receiving the request from higher layers on the subframe n, a wireless device may randomly select the transmission resources from the 20% of the least-average-RSSI resources within the subframes [n+T$_1$, n+T$_2$]. For example, T$_1$ may be 1, 2, 3, or 4 subframes, and T$_2$ may be 20 to 100 subframes. The subframes [n+T$_1$, n+T$_2$] may be selected based on latency and/or a UE implementation, and the sorting may be associated with up to (T$_2$−T$_1$+1)×(20−L$_{subCH}$+1) items. The sensing DB may be associated with up to 1000 ms×20 sub-channels. For example, the sensing and resource selection 600 illustrates that the selection window 620 may include 10 sub-channels, i.e., [0, 1, . . . , 8, and 9], for each subframe, and the transmission candidate may be set to include 5 sub-channels.

Referring to FIG. 6, each sub-channel per subframe 622 may include a high RSSI subframe 624, a medium RSSI subframe 626, or a low RSSI subframe 628, based on the average S-RSSI of the corresponding sub-channels in the sensing window 610. The determination of the high RSSI subframe 624, the medium RSSI subframe 626, or the low RSSI subframe 628 may be based on a first and second threshold value. That is, the subframe with the average S-RSSI greater than or equal to the first threshold value may be considered the high RSSI subframe 624, the subframe with the average S-RSSI less than the first threshold value and greater than or equal to the second threshold may be considered the medium RSSI subframe 626, and the subframe with the average S-RSSI less than the second threshold value may be considered the low RSSI subframe 628.

Based on a number of the high RSSI subframe 624, the medium RSSI subframe 626, or the low RSSI subframe 628 within each transmission candidates including five sub-channels, the C-V2X device may determine the 20% of the total transmission candidates which are sorted according to the least average RSSI. For example, the 20% of the least-average-RSSI resources within the subframes [n+T$_1$, n+T$_2$] may include a first transmission candidate 630, a second transmission candidate 632, a third transmission candidate 634, a fourth transmission candidate 636, and a fifth transmission candidate 638. The C-V2X device may select the transmission resource randomly from the 20% of the total transmission candidates that has the least-average-RSSI resources.

Figure 7B:
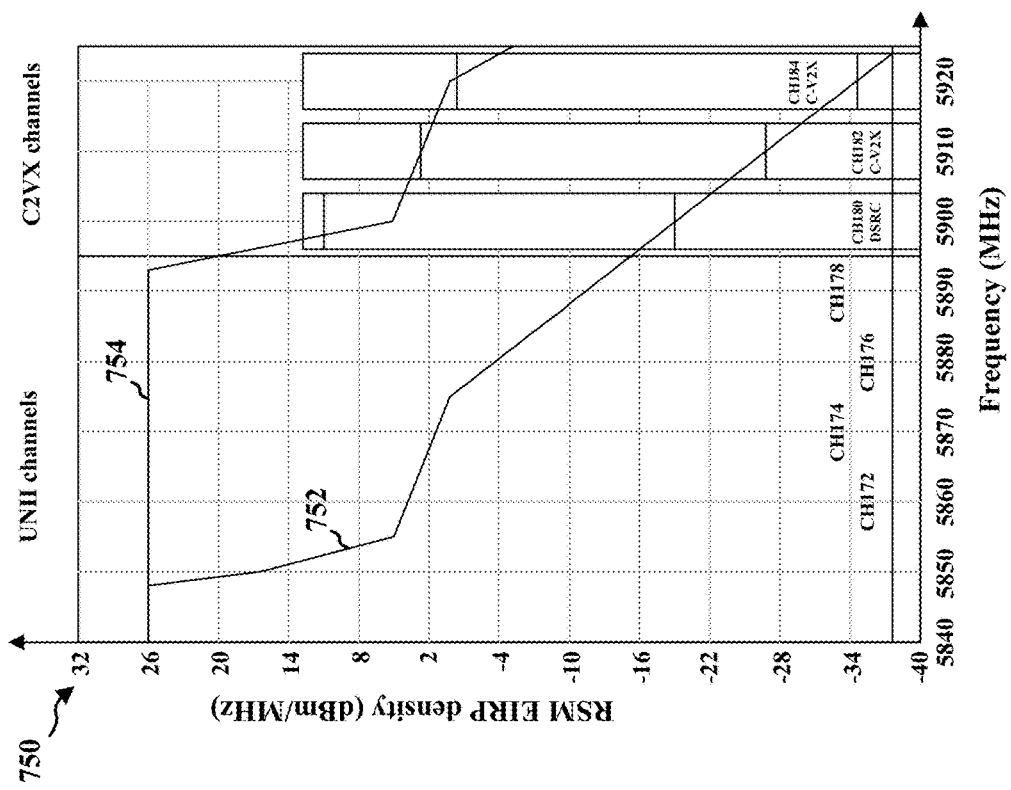
FIG. 7B illustrates the effective isotopically radiated power (EIRP) density indicating spectral mask of wireless communication.
Figure 7A:
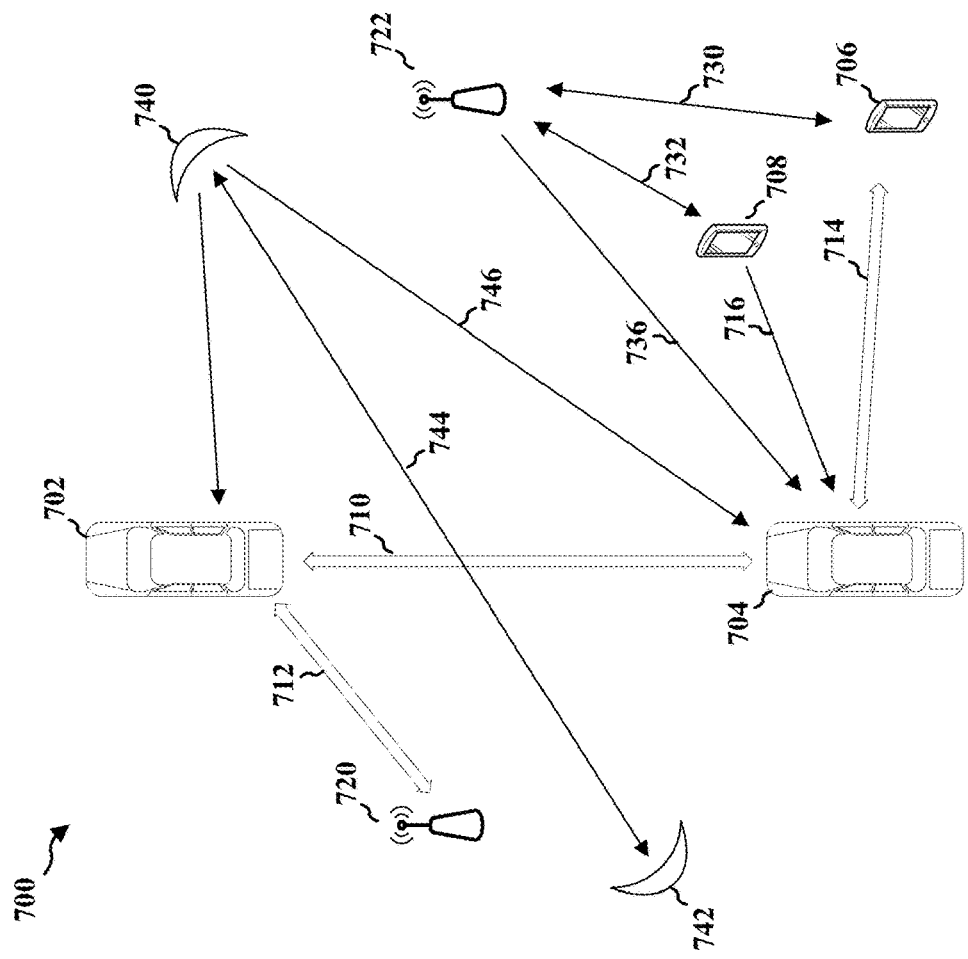
FIG. 7A illustrates an example of the C-V2X communication including interferences.

FIG. 7A illustrates an example 700 of the C-V2X communication including interferences. The example 700 may include a first vehicle 702, a second vehicle 704, a UE 706, and an infrastructure receiver 720 communicating with each other on the C-V2X communication. In one example, the first vehicle 702 and the second vehicle 704 may communicate with each other via the V2V communication 710. In another example, the first vehicle 702 and the infrastructure receiver 720 may communicate with each other via the V2I communication 712. The infrastructure receiver 720 may be a fixed road side unit (RSU). In another example, the second vehicle 704 and the UE 706 may communicate with each other via the V2P communication 714.

The example 700 may further include a number of unlicensed national information infrastructure (U-NII) devices. For example, the example 700 may include a U-NII point-to-multipoint (P-MP) transmitter 722, a U-NII point-to-point (P-P) transmitter 740, a U-NII fixed radio link 742, or a U-NII UE 708. The U-NII P-MP transmitter 722, the U-NII P-P transmitter 740, or the U-NII fixed radio link 742 may cause unintended interference on the first vehicle 702, the second vehicle 704, the UE 706. In one example, the U-NII P-P transmitter 740 and the U-NII fixed radio link 742 may communicate with each other via the U-NII point-to-point communication 744. On the other hand, the U-NII P-P transmitter 740 may transmit an off-axis signal 746 to the second vehicle 704, causing the interference on the C-V2X communication 710 established between the second vehicle 704 and the UE 706. In another example, the U-NII UE 708 or the UE 706 and the U-NII P-MP transmitter 722 may communicate with each other via the U-NII P-MP communication 732 and 730. On the other hand, the AP signal 736 from the U-MI P-MP transmitter 722 and an unintended signal 716 from the U-NII UE 708 may cause the interference on the C-V2X communication 710 or the V2P communication 714.

The U-NII radio band may cause interference to the C-V2X communication. For example, a frequency band from 6.85 GHz to 6.925 GHz may be allocated for U-NII-4. Accordingly, the U-NII transmitters may cause interference to the V2X receivers. The high level of the transmission power of the U-NII-4 transmitters may impact the performance of V2X receivers, causing interference depending on various parameters. For example, the U-NII transmitters may impact the performance of the V2X receiver based on the parameters including at least one of a distance between the V2X receiver and the U-NII transmitter (assuming line of sight), a frequency offset between the allocated channels of the U-NII-4 and V2X, or a spectral emission mask of the U-NII-4 transmitters.

FIG. 7B illustrates the EIRP density 750 indicating spectral mask of wireless communication. The EIRP density 750 may include a first spectral mask of U-NII-3 752 and a second spectral mask of U-NII-4 754. Here, the U-NII-4 P-P and/or P-MP systems operating at channel (CH) 180 may have severe interference with CH 182 and CH 184 of the V2X receivers (by more than 10 dB). The CH 172 and 184 may be operated in a high power (for example, EIRP of 40 dBm/MHz), the CH 172 operations may be moved to CH 180, and the high power may likely be retained in the CH 180 to satisfy dedicated short-range communications (DSRC) service. In such a case, the DSRC transmitters may have increased interference with the V2X receivers.

Figure 8:
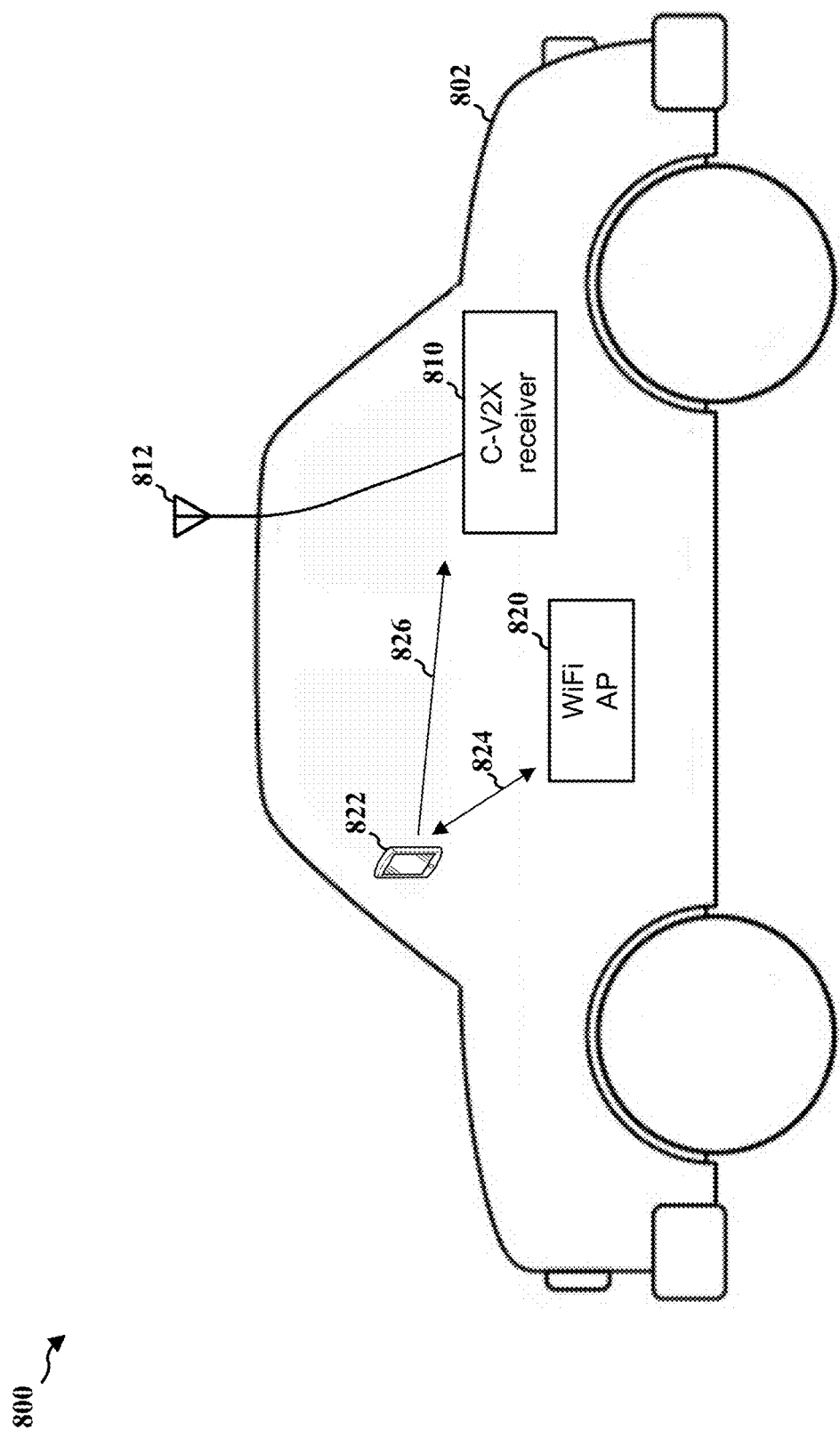
FIG. 8 illustrates an in-vehicle interference to the C-V2X communication.

FIG. 8 illustrates an in-vehicle interference 800 to the C-V2X communication. The vehicle 802 may include a C-V2X receiver 810 and the antenna 812, an in-vehicle Wi-Fi Access Point (AP) 820, a UE (e.g., a cellular-Wi-Fi UE) 822. The UE 822 and the in-vehicle Wi-Fi AP 820 may communicate with each other over a Wi-Fi signal 824. However, the Wi-Fi signal 824 between the internal car Wi-Fi AP 820 and the UE 822 may cause an interference 826 with the in-car C-V2X receiver 810, depending on various parameters including at least one of a signal isolation between the Wi-Fi-AP/Wi-Fi-user equipment antennas and the C-V2X car-roof antennas 812, a frequency offset between the allocated Wi-Fi channels and the V2X channels, and a Wi-Fi-AP spectral mask and Wi-Fi-users spectral mask.

Field trials performed with C-V2X enabled vehicles indicated that the onboard Wi-Fi and/or U-NII-4/5 may interrupt the CBR measurements for selecting the transmission resources, and, as a result, the C-V2X may not provide the alert of the interference to the driver or the operator of the vehicle on time. Accordingly, means for detecting jammers or interferences affecting the C-V2X communication may be configured to indicate a jammer detection alarm to the operator of the vehicle, the jammer detection alarm indicating that something may be wrong due to the interference. The jammer detection alarm may notify that the operator should be cautious on relying, or should not rely on the C-V2X alert and may be alerted in response to receiving the jammer detection alarm. Simply detecting the offset jammer noise coming into the C-V2X band may not be adequate since the interference from jammers may be short and the interference may not be predicted or may not allow for directly detecting the offset noise.

Figure 9:
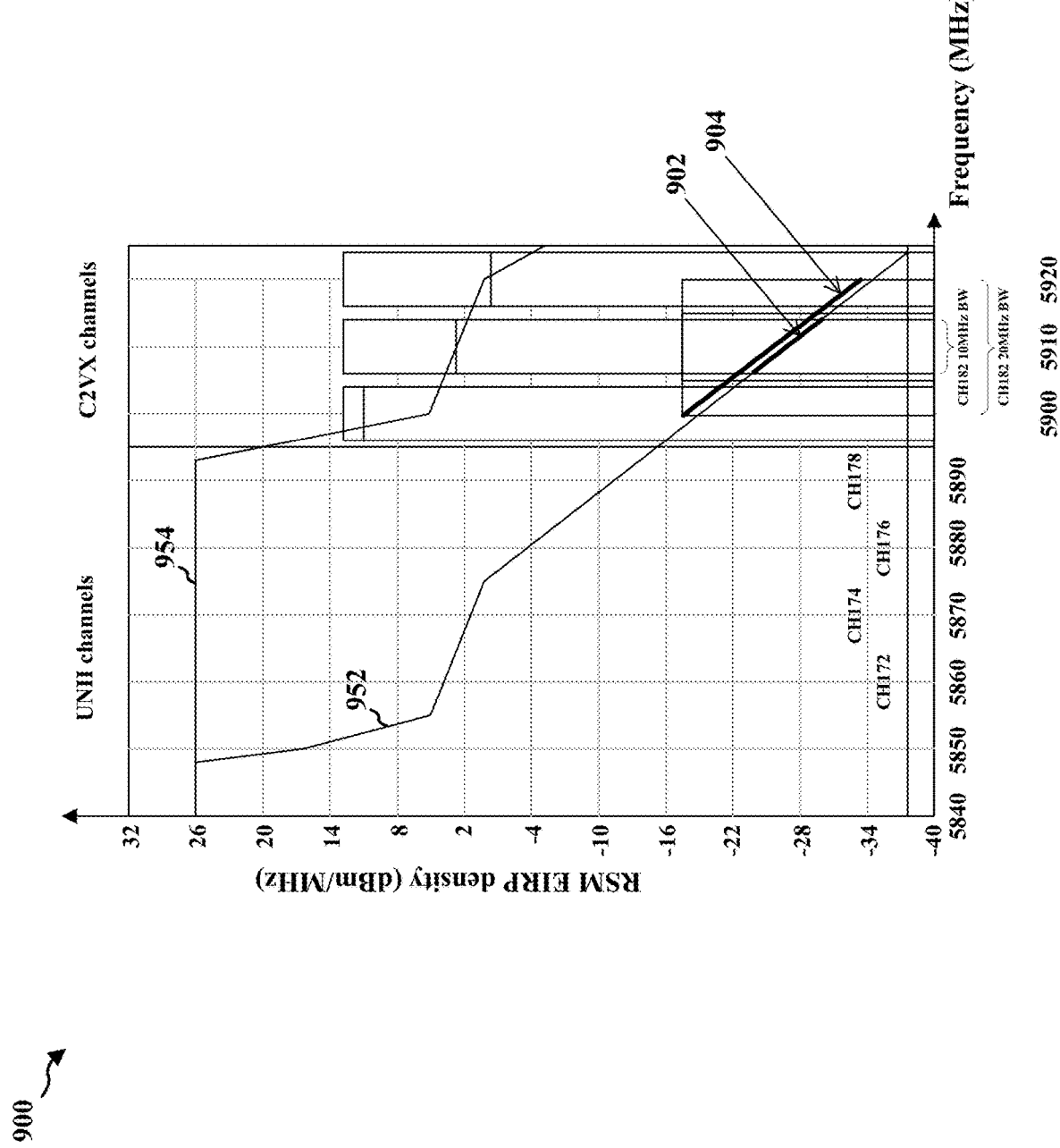
FIG. 9 illustrates interference detection of wireless communication

FIG. 9 illustrates the interference detection 900 of wireless communication. FIG. 9 illustrates the EIRP density indicating spectral mask of wireless communication. The EIRP density may include a first spectral mask of U-NII-3 952 and a second spectral mask of U-NII-4 954. Here, the U-NII-4 P-P and/or P-MP systems operating at CH 180 may have severe interference with CH 182 and CH 184 of the V2X receivers (by more than 10 dB). The CH 172 and 184 may be operated in a high power (for example, EIRP of 40 dBm/MHz), the CH 172 operations may be moved to CH 180, and the high power may likely be retained in the CH 180 to satisfy dedicated short-range communications (DSRC) service. In such a case, the DSRC transmitters may have increased interference with the V2X receivers.

The wireless device may perform energy estimation coming from offset jammers during a time period of a silent symbol, i.e., a silent symbol time. That is, the wireless device may be scheduled with the silent symbol time, the silent symbol time being associated with no expected data transmission. Accordingly, the wireless device may be configured to be in an inactive mode (e.g., idle mode) during the silent symbol. If the wireless device estimate any signal during the silent symbol time, the estimated signal may be at least one of a noise or an interference. For example, a symbol 13 may be configured as the silent symbol time for the C-V2X communication, and the wireless device operating via the C-V2X communication may expect no C-V2X transmissions may be received in the silent symbol time, the symbol 13. The detection may be based on determining a WBEE after analog to digital conversion (ADC) and before demodulation. The WBEE may be measured or detected by a wideband energy estimator, and the WBEE may correspond to a measurement of the energy (or, in some examples, the power) of the received wideband signal after analog to digital conversion (ADC) and before demodulation.

In one aspect of the disclosure, the wireless device may be configured to operate with a first bandwidth, and the wireless device may activate the WBEE over a time duration to generate a first WBEE at the first bandwidth. In another aspect, the wireless device may switch the bandwidth to a second bandwidth, and activate the WBEE over the time duration to generate a second WBEE at the second bandwidth. The wireless device may calculate a bandwidth ratio of the second bandwidth to the first bandwidth and a WBEE ratio of the second WBEE to the second WBEE. The wireless device may compare the WBEE ratio with the bandwidth ratio to determine whether there is an interference detected in the silent symbol time. That is, when the second bandwidth is greater than the first bandwidth, the wireless device may identify the interference based on the WBEE ratio being greater than the BW ratio by a threshold value. In one aspect, the threshold value may be a constant number. In another aspect, the threshold value may be determined based on the BW ratio, e.g., a half of the BW ratio. For example, when the BW ratio of the second BW to the first BW is 2, the threshold value may be 1 (2/2), and the wireless device may identify the interference caused by the jammer if the WBEE of the second WBEE to the first WBEE is greater than 3, i.e., the BW ratio of 2+the threshold value of 1.

For example, the wireless device may have a bandwidth of 10 MHz, and the wireless device may activate the WBEE at the beginning of the symbol 13 over an accumulated time of 20 μs (as an example) and save it as WBEE-10 MHz. Subsequently, the wireless device may change the bandwidth to 20 MHz and activate the WBEE over following accumulated time of 20 microseconds (μs) and save it as WBEE-20 MHz. Here, a first accumulated noise 902 over CH 182 10 MHz bandwidth represents the WBEE-10 MHz, and a second accumulated noise 904 over CH 182 20 MHz bandwidth represents the WBEE-20 MHz. The wireless device may calculate the ratio of the WBEE-20 MHz to the WBEE-10 MHz (i.e., WBEE-20 MHz/WBEE-10 MHz) and determine that, if the WBEE-20 MHz/WBEE-10 MHz ratio is greater than 2 by a threshold value, then the wireless device may identify the existence of the jammer interference since the offset noise is much larger close to the jammer.

At the symbol 13, no C-V2X signal may be expected, and therefore when there is no jammer signal interference, the WBEE measured during the silent symbol may correspond to noise at the receiver with almost equal power spectral density (PSD). Therefore, the WBEE ratio of the second WBEE measured over the second BW to the first WBEE measured over the first BW may be substantially the same as the BW ratio of the second BW to the first BW. For example, the measured energy over CH 182 20 MHz BW may be expected to be about 2 times the measured energy over CH 182 10 MHz BW.

In one aspect, the measuring or detecting of the WBEE may be performed for at least a part of the time period of the silent symbol. That is, the wireless device may measure the first WBEE over a first BW, e.g., the operation BW, for a time duration within the time period of the silent symbol, and measure the second WBEE over a second BW for the time duration within the time period of the silent symbol. The wireless device may be configured with more than two (2) BWs including the operation BW to measure the WBEE during the time period of the silent symbol. That is, the wireless device may also be configured with a third BW, and the wireless device may measure the third WBEE over the third BW for the time duration within the time period of the silent symbol. The wireless device may select to measure at least two WBEE from at least two BW from the more than two BWs including the first BW, the second BW, the third BW, etc. Here, the time duration within the time period of the silent symbol may be substantially shorter than the time period of the silent symbol. For example, the wireless device may be activated for 20 μs for measuring each WBEE.

In some aspects, the wireless device may first measure or detect the first WBEE over the first BW and the second WBEE over the second BW, then further measure a third WBEE over the third BW based on the result of identifying the interference with the first WBEE and the second WBEE. In one aspect, the wireless device may further measure or detect the third WBEE over the third BW based on the failure to identify an interference based on the first WBEE and the second WBEE. That is, the wireless device may further measure or detect the third WBEE over the third BW when the first WBEE and the second WBEE fail to show the interference. In another aspect, the wireless device may further measure or detect the third WBEE over the third BW based on identifying an interference based on the first WBEE and the second WBEE. That is, the wireless device may further measure or detect the third WBEE over the third BW when the first WBEE and the second WBEE show the interference. In another aspect, the wireless device may measure or detect three WBEEs including the first WBEE, the second WBEE, and the third WBEE, and determine that the interference is identified based on at least one of the first ratio of the second WBEE to the first WBEE or the second ratio of the third WBEE to the first WBEE identifying the interference.

The wireless device may sequentially measure the WBEEs of the at least two selected BWs. That is, the wireless device may enter active mode during the time period to measure the first WBEE over the first BW for the time duration and the second WBEE over the second BW for the time duration, and enter inactive mode (e.g., idle mode) after identifying the interference in the time period of the silent symbol based on the first WBEE and the second WBEE. For example, the wireless device may first enter the active mode to measure or detect the first WBEE over the first BW for 20 μs and measure or detect the second BWE over the second BW for another 20 μs, and enter the inactive mode (e.g., idle mode) for the rest of the time period of the silent symbol after identifying the interference based on the first WBEE and the second WBEE. Upon completing the identification of the interference based on the at least two WBEEs, the wireless device may enter the inactive mode (e.g., idle mode) for the rest of the time period of the silent symbol to conserve power.

In a case where a strong jammer signal (such as Wi-Fi or U-Nii signal) with spectral emission mask may be induced, the interference caused by the strong jammer may be detected above noise, e.g., receiver thermal noise. First, the wireless device may detect a first WBEE over 10 MHz BW of one channel (e.g., CH 182), and a second WBEE over 20 MHz BW of one channel (e.g., CH 182). That is, the wireless device may measure the energy over CH 182 10 MHz BW and then switch the BW to 20 MHz to measure the energy over the CH 182 20 MHz BW. When there is a strong jammer producing interference, the second WBEE may be greater than twice the first WBEE, since the jammer signal mask is higher at the lower edge of the 20 MHz BW. That is, double the accumulated noise over CH 182 10 MHz bandwidth may be significantly lower or smaller than the noise accumulated over CH 182 20 MHz BW, since the jammer signal mask is higher at the lower edge of the 20 MHz, and it may drop down. Particularly, a WBEE ratio of the second WBEE of the second BW to the first WBEE of the first BW may be greater than a BW ratio of the second BW to the first BW by a threshold value. This rule may be applied for jammer signals that appear on either side of the allocated channel (e.g., the higher and/or lower than the allocated channel). Accordingly, the wireless device may identify the interference in response to the WBEE ratio of the second WBEE to the first WBEE (WBEE-20 MHz/WBEE-10 MHz) being greater than 2.

In another aspect of the disclosure, the wireless device may have an operation bandwidth of 20 MHz. For example, the wireless device may activate the WBEE at a beginning of the symbol 13 over accumulated time of 20 μs (as an example) and save it as WBEE-20 MHz. Subsequently, the wireless device may change the BW to 10 MHz and activate the WBEE over a follow-up accumulated time of 20 μs and save it as WBEE-10 MHz. The wireless device may calculate the ratio of the WBEE-20 MHz to the WBEE-10 MHz (i.e., WBEE-20 MHz/WBEE-10 MHz) and determine that, if the WBEE-20 MHz/WBEE-10 MHz ratio is greater than 2 by a threshold value (for example, 0.5), then the wireless device may identify the jammer interference since the offset noise is larger close to the jammer. Accordingly, the wireless device may identify the interference in response to the WBEE ratio of the first WBEE to the second WBEE (WBEE-20 MHz/WBEE-10 MHz) being greater than 2 by the threshold value.

In one aspect, the second bandwidth may be selected from a plurality of bandwidth candidates. That is, the wireless device configured with the first bandwidth of the normal operation, and the wireless device may be configured with a plurality of bandwidth candidates. The wireless device may select one bandwidth candidate among the plurality of bandwidth candidates. For example, the wireless device may be operating in a 10 MHz, and the wireless device may be configured with the plurality of bandwidth candidates including 20 MHz, 40 MHz, or 80 MHz. The wireless device may select one of the 20 MHz, 40 MHz, or 80 MHz of bandwidth. For example, the wireless device may select 40 MHz bandwidth as the second bandwidth, and identify the interference by comparing the WBEE ratio of the second WBEE to the first WBEE (WBEE-40 MHz/WBEE-10 MHz) and the bandwidth ratio of the second bandwidth to the first bandwidth (40 MHz/10 MHz). Accordingly, the wireless device may identify the interference in response to the WBEE ratio of the second WBEE to the first WBEE (WBEE-40 MHz/WBEE-10 MHz) being greater than 4 by the threshold value.

In another aspect, the second bandwidth may be a fraction of the first bandwidth of the normal operation. For example, the wireless device may be operating in a 20 MHz, and the second bandwidth of the wireless device may be configured with 10 MHz. Because the second bandwidth is smaller than the first bandwidth, the wireless device may identify the interference by comparing the WBEE ratio of the first WBEE to the second WBEE (WBEE-20 MHz/WBEE-10 MHz) and the bandwidth ratio of the first bandwidth to the second bandwidth (20 MHz/10 MHz). Accordingly, the wireless device may identify the interference in response to the WBEE ratio of the first WBEE to the second WBEE (WBEE-20 MHz/WBEE-10 MHz) being greater than 2 by the threshold value.

In another aspect, the second bandwidth may be a multiple of the first bandwidth, and the second bandwidth may be determined based on the first bandwidth and the multiple. The multiple may be determined to increase the interference sensitivity. For example, the wireless device may be operating in a 10 MHz, and the wireless device may determine that multiple of 1.5 may have the increased sensitivity in detecting the interferences. Accordingly, the wireless device may determine that the second bandwidth is the 15 MHz. After detecting the first WBEE at 10 MHz (WBEE-10 MHz) and the second WBEE at 15 MHz (WBEE-15 MHz), the wireless device may identify the interference by comparing the WBEE ratio of the second WBEE to the first WBEE (WBEE-15 MHz/WBEE-10 MHz) and the bandwidth ratio of the second bandwidth to the first bandwidth (15 MHz/10 MHz). Accordingly, the wireless device may identify the interference in response to the WBEE ratio of the second WBEE to the first WBEE (WBEE-15 MHz/WBEE-10 MHz) being greater than 1.5 by the threshold value.

Figure 10:
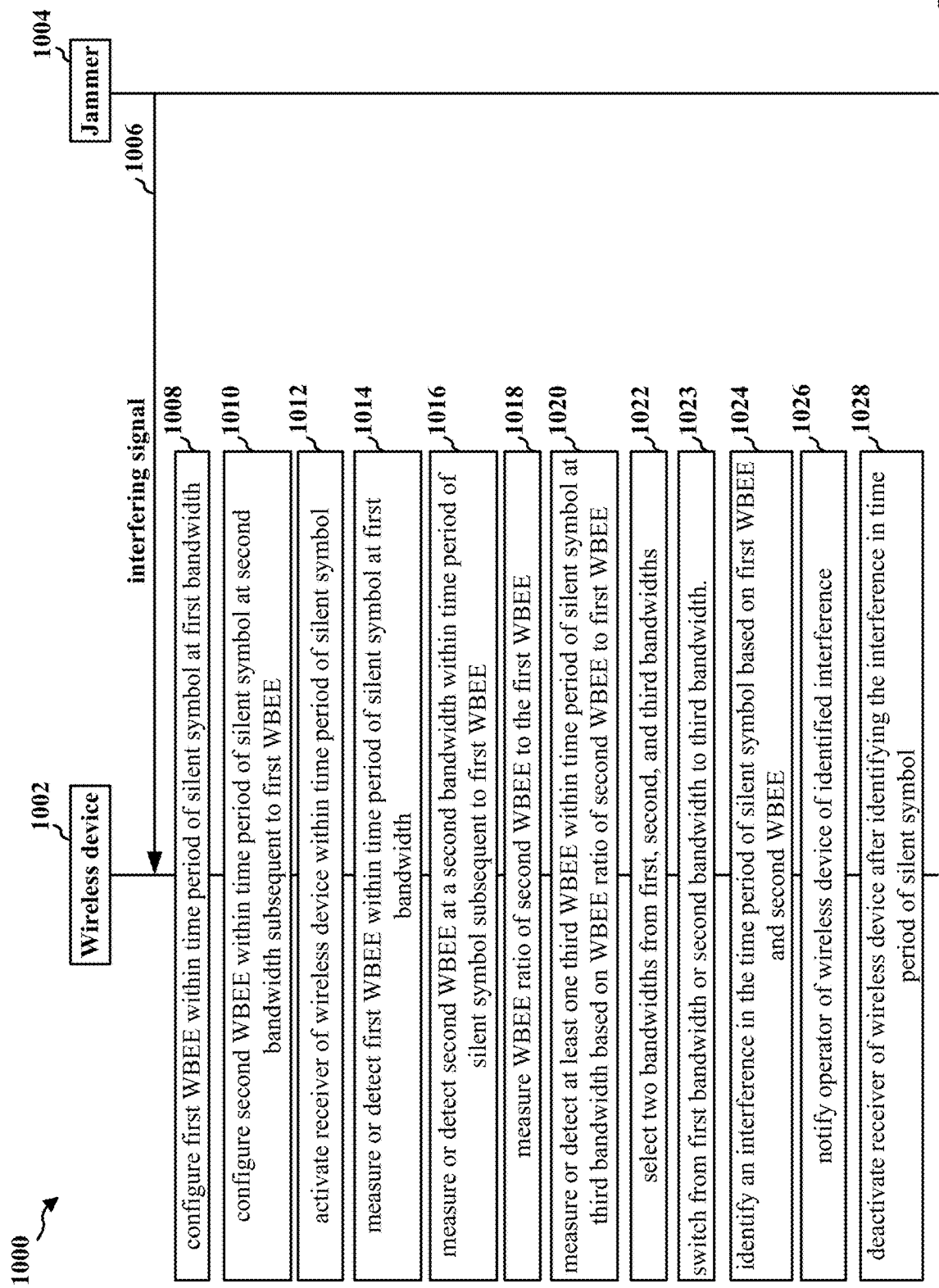
FIG. 10 is a call-flow diagram of wireless communication.

FIG. 10 is a call-flow diagram 1000 of wireless communication. The wireless communication may include a wireless device 1002 and a jammer 1004. The jammer may transmit the interfering signal 1006, and the wireless device 1002 may measure or detect a first WBEE at a first bandwidth and a second WBEE at a second bandwidth in a time period of a silent symbol to identify the interfering signal 1006.

At 1006, the jammer 1004 may transmit an interference signal to the wireless device 1002. The interference may be associated with a jammer 1004 or a signal jamming device. The UE may measure of detect the in-band noise within the C-V2X receiver bandwidth coming from the jammer 1004 by offset interferences at symbol 13 where no C-V2X device transmits. In one aspect, the data transmission may be a C-V2X connection. The last symbol within a subframe may be associated with a silent mode, and the silent symbol within the subframe may be a symbol 13 of the C-V2X connection associated with the silent mode or any intermittent time that is identified with no transmission or reception within the subframe.

At 1008, the wireless device 1002 may configure the first WBEE within the time period of the silent symbol at the first bandwidth. The wireless device 1002 may be scheduled with the time period of the silent symbol, and the time period of the silent symbol may be associated with no expected data transmission. Accordingly, any signal estimated in the time period of the silent symbol may be at least one of a noise or an interference. For example, a symbol 13 may be configured as the time period of the silent symbol for the C-V2X communication, and the wireless device 1002 operating via the C-V2X communication may expect no C-V2X transmissions may be received in the time period of the silent symbol, the symbol 13. The WBEE may be measured or detected by a wideband energy estimator, and the first WBEE may correspond to a measurement of the energy (or, in some examples, the power) of the received wideband signal at the first bandwidth after analog to digital conversion (ADC) and before demodulation. The configuration of the first WBEE may include a time duration within the time period of the silent symbol to measure or detect the first WBEE.

At 1010, the wireless device 1002 may configure the second WBEE within the time period of the silent symbol at the second bandwidth subsequent to the first WBEE. The WBEE may be measured or detected by a wideband energy estimator, and the second WBEE may correspond to a measurement of the energy (or, in some examples, the power) of the received wideband signal at the second bandwidth after analog to digital conversion (ADC) and before demodulation. The configuration of the second WBEE may include the time duration within the time period of the silent symbol to measure or detect the second WBEE.

In one aspect, the second bandwidth may be selected from a plurality of bandwidth candidates. That is, the wireless device 1002 configured with the first bandwidth of the normal operation, and the wireless device 1002 may be configured with a plurality of bandwidth candidates. In another aspect, the second bandwidth may be a multiple of the first bandwidth, and the second bandwidth may be determined based on the first bandwidth and the multiple. The multiple may be determined to increase the interference sensitivity.

At 1012, the wireless device 1002 may activate a receiver of the wireless device 1002 within a part of the time period of the silent symbol to measure or detect the first WBEE and the second WBEE. During the time period of the silent symbol, the wireless device 1002 may be configured not to communicate C-V2X communication and deactivate the receiver to conserve power. During the identification of the interferences, the wireless device 1002 may activate the receiver for a part of the time duration to measure or detect the first and second WBEE within the time period of the silent symbol at the first bandwidth and the second bandwidth.

At 1014, the wireless device 1002 may measure or detect a first WBEE within the time period of the silent symbol at a first bandwidth, the time period of the silent symbol being associated with no expected data transmission. The first WBEE may be measured or detected at the first bandwidth for the time duration within the time period of the silent symbol. For example, the wireless device 1002 may determine a first WBEE of a symbol at a first bandwidth, the symbol associated with no expected C-V2X transmissions. For example, the wireless device 1002 may take the energy measurements after the ADC using WBEE before demodulation over TBD accumulated time (for example, 20 µs) allocated for C-V2X 10 MHz BW.

At 1016, the wireless device 1002 may measure or detect a second WBEE at a second bandwidth within the time period of the silent symbol subsequent to the first WBEE, the second bandwidth being different from the first bandwidth. In one aspect, the second bandwidth may be a multiple of the first bandwidth. The second WBEE may be measured or detected at the second bandwidth for the time duration within the time period of the silent symbol. For example, the wireless device 1002 may determine a second WBEE of the symbol at a second bandwidth, the symbol associated with no expected C-V2X transmissions. For example, the wireless device 1002 may switch to the 20 MHz BW, take the WBEE over the following accumulated time (for example, 20 μs), and save it as WBEE-20 MHz.

At 1018, the wireless device 1002 may measure a WBEE ratio of the second WBEE to the first WBEE. Here, the WBEE ratio may refer to the ratio of the second WBEE to the first WBEE (WBEE$_2$/WBEE$_1$). In response to the interfering signal transmitted by the jammer 1004, the WBEE ratio measured during the time period of the silent symbol may be greater than the bandwidth ratio of the second bandwidth to the first bandwidth.

At 1020, the wireless device 1002 may measure or detect at least one third WBEE subsequent to the second WBEE within the time period of the silent symbol at a third bandwidth based on the measured WBEE ratio of the second WBEE to the first WBEE. In one aspect, the third bandwidth may be selected from a plurality of bandwidth candidates. That is, the wireless device 1002 configured with the first bandwidth of the normal operation, and the wireless device 1002 may be configured with a plurality of bandwidth candidates. In another aspect, the third bandwidth may be a multiple of the first bandwidth, and the third bandwidth may be determined based on the first bandwidth and the multiple. The multiple may be determined to increase the interference sensitivity.

At 1022, the wireless device 1002 may select two bandwidths from the first bandwidth, the second bandwidth, and the third bandwidth. The wireless device 1002 may measure or detect the WBEEs at two bandwidths including the first bandwidth to identify the interference.

At 1023, the wireless device 1002 may switch from the first bandwidth or the second bandwidth to the third bandwidth based on the third bandwidth being selected at 1022.

At 1024, the wireless device 1002 may identify an interference in the time period of the silent symbol based on the first WBEE and the second WBEE. The interference may be associated with a jammer 1004 or a signal jamming device. The interference may be identified based on a WBEE ratio of the second WBEE to the first WBEE being greater than a bandwidth ratio of the second bandwidth to the first bandwidth. Furthermore, a threshold value may be configured, and the wireless device 1002 may identify the interference based on the WBEE ratio of the second WBEE to the first WBEE being greater than a bandwidth ratio of the second bandwidth to the first bandwidth by a threshold value. For example, the wireless device 1002 may identify an interference based on the first WBEE and the second WBEE. For example, the wireless device 1002 may calculate the ratio of the WBEE-20 MHz to the WBEE-10 MHz (i.e., WBEE-20 MHz/WBEE-10 MHz) and identify the interference based on the ratio is substantially greater than 2. Here, the ratio substantially greater than 2 may refer to a value greater than 2 with the threshold value (i.e., 2+threshold value).

At 1026, the wireless device 1002 may notify an operator of the wireless device 1002 of the identified interference. For example, the wireless device 1002 may provide a jammer detection alarm to the operator of a vehicle of the C-V2X communication. Accordingly, the operator of the wireless device 1002 may be alerted that the C-V2X communication may be affected by interferences, thereby affecting the intelligent transportation systems (ITS) of the vehicle.

At 1028, the wireless device 1002 may deactivate the receiver of the wireless device 1002 after identifying the interference for the rest of the time period of the silent symbol based on the first WBEE and the second WBEE.

Accordingly, the wireless device may provide the alert of jammer to the operator of the wireless device and the wireless device or the operator may be aware of jammer that may affect the performance of the wireless device, and alerting the operator that he may not be able to confidently rely on the operation of the wireless device. The wireless device may also keep up with the rapid change in the environment, e.g., driving, and notify the operator that the e and the operation of the wireless device may be recovered.

Figure 11:
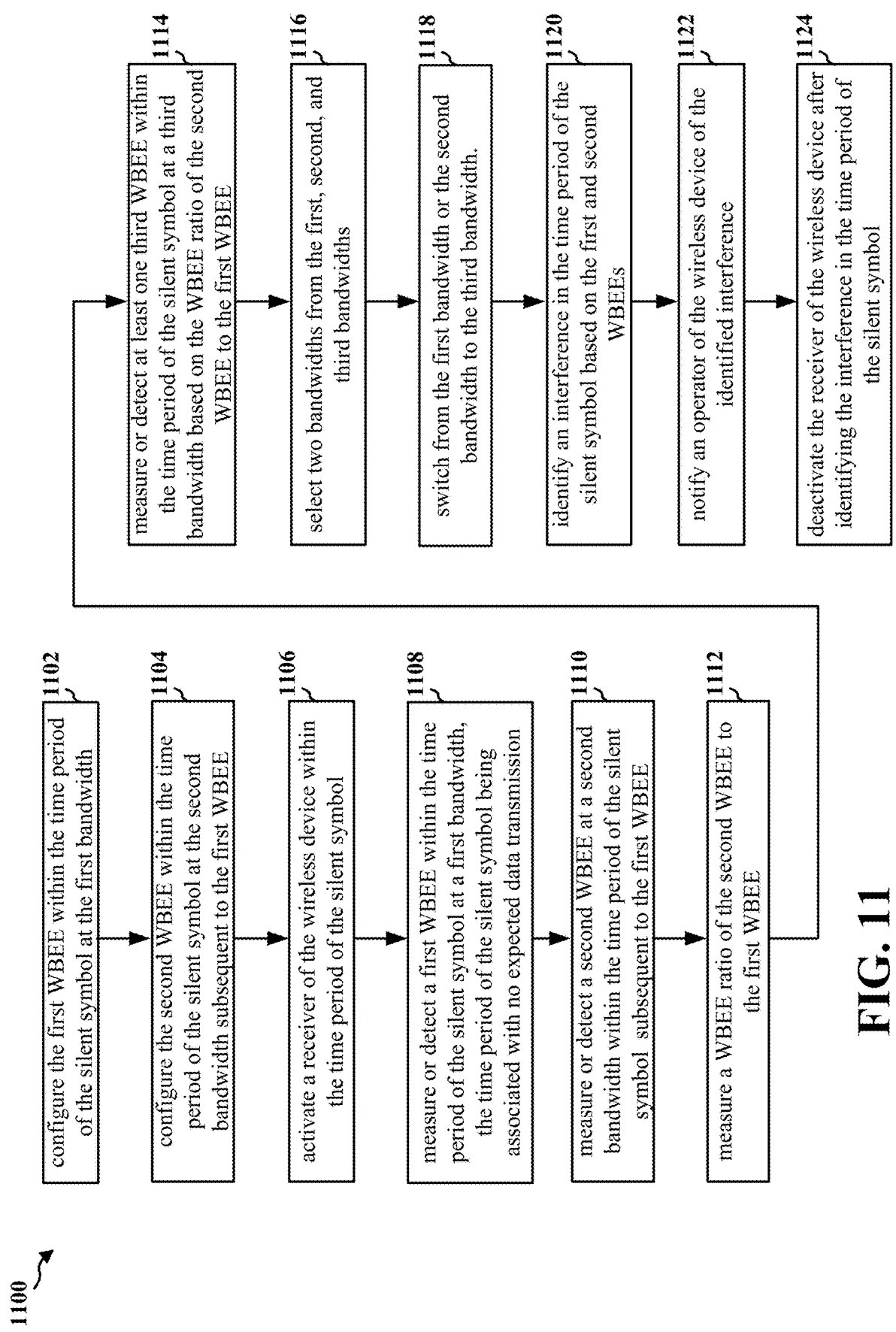
FIG. 11 is a flow chart of wireless communication.

FIG. 11 is a flowchart 1100 of a method of wireless communication. The method may be performed by a wireless device (e.g., the UE 104; wireless device 1002; the apparatus 1302). The wireless communication may include a wireless device and a jammer. The jammer may transmit the interfering signal, and the wireless device may measure or detect a first WBEE at a first bandwidth and a second WBEE at a second bandwidth in a time period of the silent symbol to identify the interfering signal. The interference may be associated with a jammer or a signal jamming device. The UE may measure or detect the in-band noise within the C-V2X receiver bandwidth coming from the jammer by offset interferences at symbol 13 where no C-V2X device transmits. In one aspect, the data transmission may be a C-V2X connection. The last symbol within a subframe may be associated with a silent mode, and the silent symbol within the subframe may be a symbol 13 of the C-V2X connection associated with the silent mode or any intermittent time that is identified with no transmission or reception within the subframe.

At 1102, the wireless device may configure the first WBEE within the time period of the silent symbol at the first bandwidth. The wireless device may be scheduled with the time period of the silent symbol, and the time period of the silent symbol may be associated with no expected data transmission. Accordingly, any signal estimated in the time period of the silent symbol may be at least one of a noise or an interference. For example, a symbol 13 may be configured as the time period of the silent symbol for the C-V2X communication, and the wireless device operating via the C-V2X communication may expect no C-V2X transmissions may be received in the time period of the silent symbol, the symbol 13. The WBEE may be measured or detected by a wideband energy estimator, and the first WBEE may correspond to a measurement of the energy (or, in some examples, the power) of the received wideband signal at the first bandwidth after ADC and before demodulation. The configuration of the first WBEE may include a time duration within the time period of the silent symbol to measure or detect the first WBEE. For example, at 1008, the wireless device 1002 may configure the first WBEE within the time period of the silent symbol at the first bandwidth. Furthermore, 1102 may be performed by a WBEE component 1340.

At 1104, the wireless device may configure the second WBEE within the time period of the silent symbol at the second bandwidth subsequent to the first WBEE. The WBEE may be measured or detected by a wideband energy estimator, and the second WBEE may correspond to a measurement of the energy (or, in some examples, the power) of the received wideband signal at the second bandwidth after ADC and before demodulation. The configuration of the second WBEE may include the time duration within the time period of the silent symbol to measure or detect the second WBEE. For example, at 1010, the wireless device 1002 may configure the second WBEE within the time period of the silent symbol at the second bandwidth subsequent to the first WBEE. Furthermore, 1104 may be performed by the WBEE component 1340.

In one aspect, the second bandwidth may be selected from a plurality of bandwidth candidates. That is, the wireless device configured with the first bandwidth of the normal operation, and the wireless device may be configured with a plurality of bandwidth candidates. In another aspect, the second bandwidth may be a multiple of the first bandwidth, and the second bandwidth may be determined based on the first bandwidth and the multiple. The multiple may be determined to increase the interference sensitivity.

At 1106, the wireless device may activate a receiver of the wireless device within a part of the time period of the silent symbol to measure or detect the first WBEE and the second WBEE. During the time period of the silent symbol, the wireless device may be configured not to communicate C-V2X communication and deactivate the receiver to conserve power. During the identification of the interferences, the wireless device may activate the receiver for a part of the time duration to measure or detect the first and second WBEE within the part of the time period of the silent symbol at the first bandwidth and the second bandwidth. For example, at 1012, the wireless device 1002 may activate a receiver of the wireless device 1002 within a part of the time period of the silent symbol to measure or detect the first WBEE and the second WBEE. Furthermore, 1106 may be performed by a receiver component 1342.

At 1108, the wireless device may measure or detect a first WBEE within a time period of the silent symbol at a first bandwidth, the time period of the silent symbol being associated with no expected data transmission. The first WBEE may be measured or detected at the first bandwidth for the time duration within the time period of the silent symbol. For example, the wireless device may determine a first WBEE of a symbol at a first bandwidth, the symbol associated with no expected C-V2X transmissions. For example, the wireless device may take the energy measurements after the ADC using WBEE before demodulation over TBD accumulated time (for example, 20 µs) allocated for C-V2X 10 MHz BW. For example, at 1014, the wireless device 1002 may measure or detect a first WBEE within a time period of the silent symbol at a first bandwidth, the time period of the silent symbol being associated with no expected data transmission. Furthermore, 1108 may be performed by the WBEE component 1340.

At 1110, the wireless device may measure or detect a second WBEE at a second bandwidth within the time period of the silent symbol subsequent to the first WBEE, the second bandwidth being different from the first bandwidth. In one aspect, the second bandwidth may be a multiple of the first bandwidth. The second WBEE may be measured or detected at the second bandwidth for the time duration within the time period of the silent symbol. For example, the wireless device may determine a second WBEE of the symbol at a second bandwidth, the symbol associated with no expected C-V2X transmissions. For example, the wireless device may switch to the 20 MHz BW, take the WBEE over the following accumulated time (for example, 20 µs), and save it as WBEE-20 MHz. For example, at 1016, the wireless device 1002 may measure or detect a second WBEE at a second bandwidth within the time period of the silent symbol subsequent to the first WBEE, the second bandwidth being different from the first bandwidth. Furthermore, 1110 may be performed by the WBEE component 1340.

At 1112, the wireless device may measure a WBEE ratio of the second WBEE to the first WBEE. Here, the WBEE ratio may refer to the ratio of the second WBEE to the first WBEE ($WBEE_2/WBEE_1$). In response to the interfering signal transmitted by the jammer, the WBEE ratio measured during the time period of the silent symbol may be greater than the bandwidth ratio of the second bandwidth to the first bandwidth. For example, at 1018, the wireless device 1002 may measure a WBEE ratio of the second WBEE to the first WBEE. Here, the WBEE ratio may refer to the ratio of the second WBEE to the first WBEE ($WBEE_2/WBEE_1$). Furthermore, 1112 may be performed by the WBEE component 1340.

At 1114, the wireless device may measure or detect at least one third WBEE subsequent to the second WBEE within the time period of the silent symbol at a third bandwidth based on the measured WBEE ratio of the second WBEE to the first WBEE. In one aspect, the third bandwidth may be selected from a plurality of bandwidth candidates. That is, the wireless device configured with the first bandwidth of the normal operation, and the wireless device may be configured with a plurality of bandwidth candidates. In another aspect, the third bandwidth may be a multiple of the first bandwidth, and the third bandwidth may be determined based on the first bandwidth and the multiple. The multiple may be determined to increase the interference sensitivity. For example, at 1020, the wireless device 1002 may measure or detect at least one third WBEE within the time period of the silent symbol at a third bandwidth based on the measured WBEE ratio of the second WBEE to the first WBEE. Furthermore, 1114 may be performed by the WBEE component 1340.

At 1116, the wireless device may select two bandwidths from the first bandwidth, the second bandwidth, and the third bandwidth. The wireless device may measure or detect the WBEEs at two bandwidths including the first bandwidth to identify the interference. For example, at 1022, the wireless device 1002 may select two bandwidths from the first bandwidth, the second bandwidth, and the third bandwidth. Furthermore, 1116 may be performed by a bandwidth component 1344.

At 1118, the wireless device may switch from the first bandwidth or the second bandwidth to the third bandwidth based on the third bandwidth being selected at 1116. For example, at 1023, the wireless device 1002 may switch from the first bandwidth or the second bandwidth to the third bandwidth based on the third bandwidth being selected at 1022. Furthermore, 1118 may be performed by the bandwidth component 1344.

At 1120, the wireless device may identify an interference in the time period of the silent symbol based on the first WBEE and the second WBEE. The interference may be associated with a jammer or a signal jamming device. The interference may be identified based on a WBEE ratio of the second WBEE to the first WBEE being greater than a bandwidth ratio of the second bandwidth to the first bandwidth. Furthermore, a threshold value may be configured, and the wireless device may identify the interference based on the WBEE ratio of the second WBEE to the first WBEE being greater than a bandwidth ratio of the second bandwidth to the first bandwidth by a threshold value. For example, the wireless device may identify an interference based on the first WBEE and the second WBEE. For example, the wireless device may calculate the ratio of the WBEE-20 MHz to the WBEE-10 MHz (i.e., WBEE-20 MHz/WBEE-10 MHz) and identify the interference based on the ratio is substantially greater than 2. Here, the ratio substantially greater than 2 may refer to a value greater than 2 with the threshold value (i.e., 2+threshold value). For example, at 1024, the wireless device 1002 may identify an interference in the time period of the silent symbol based on the first WBEE and the second WBEE. Furthermore, 1120 may be performed by an interference identifying component 1346.

At 1122, the wireless device may notify an operator of the wireless device of the identified interference. For example, the wireless device may provide a jammer detection alarm to the operator of a vehicle of the C-V2X communication. Accordingly, the operator of the wireless device may be alerted that the C-V2X communication may be affected by interferences, thereby affecting the intelligent transportation systems (ITS) of the vehicle. For example, at 1026, the wireless device 1002 may notify an operator of the wireless device 1002 of the identified interference. Furthermore, 1122 may be performed by a notifying component 1348.

At 1124, the wireless device may deactivate the receiver of the wireless device after identifying the interference for the rest of the time period of the silent symbol based on the first WBEE and the second WBEE. For example, at 1028, the wireless device 1002 may deactivate the receiver of the wireless device 1002 after identifying the interference for the rest of the time period of the silent symbol based on the first WBEE and the second WBEE. Furthermore, 1124 may be performed by the receiver component 1342.

Figure 12:
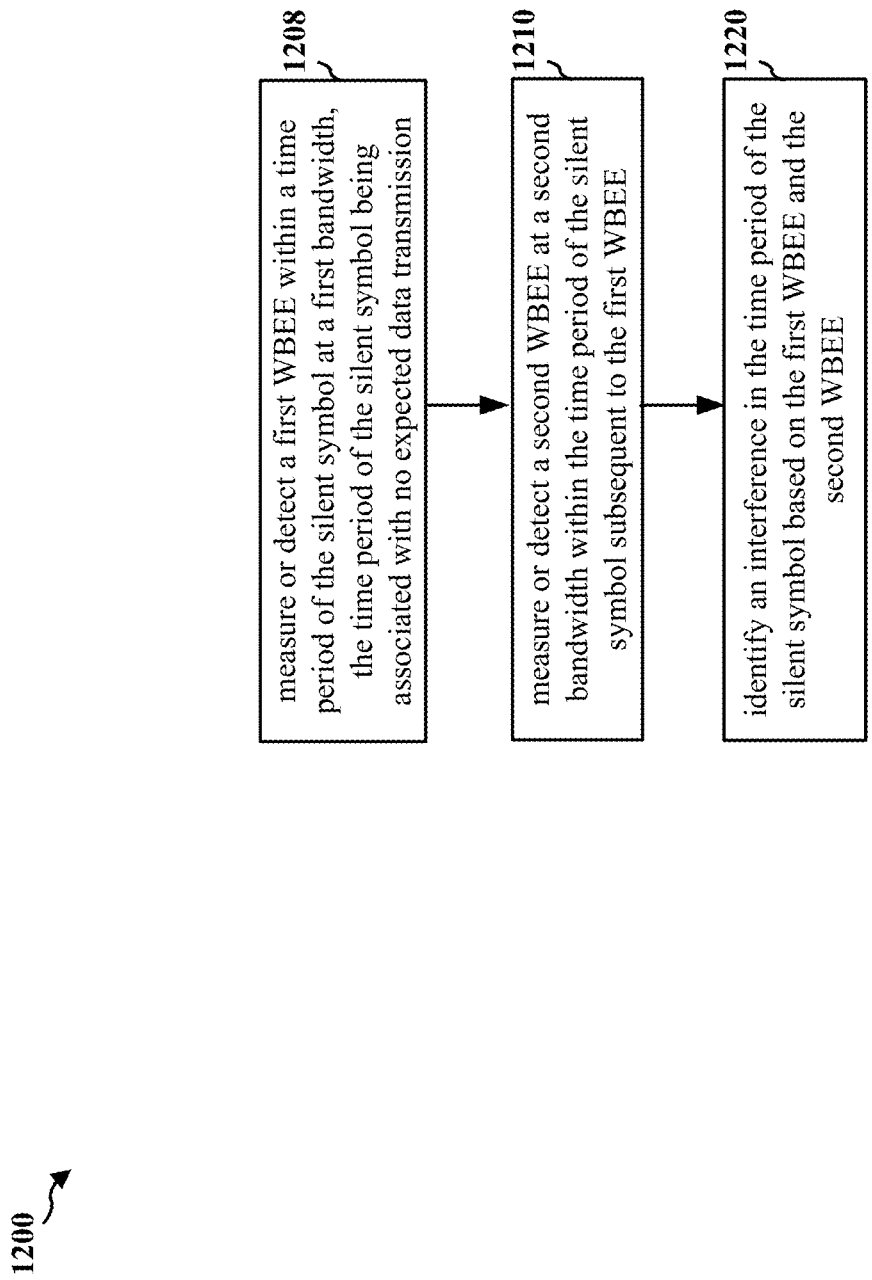
FIG. 12 is a flow chart of wireless communication.

FIG. 12 is a flowchart 1200 of a method of wireless communication. The method may be performed by a wireless device (e.g., the UE 104; the wireless device 1002; the apparatus 1302). The wireless communication may include a wireless device and a jammer. The jammer may transmit the interfering signal, and the wireless device may measure or detect a first WBEE at a first bandwidth and a second WBEE at a second bandwidth in a time period of the silent symbol to identify the interfering signal. The interference may be associated with a jammer or a signal jamming device. The UE may measure or detect the in-band noise within the C-V2X receiver bandwidth coming from the jammer by offset interferences at symbol 13 where no C-V2X device transmits. In one aspect, the data transmission may be a C-V2X connection. The last symbol within a subframe may be associated with a silent mode, and the silent symbol within the subframe may be a symbol 13 of the C-V2X connection associated with the silent mode or any intermittent time that is identified with no transmission or reception within the subframe.

At 1208, the wireless device may measure or detect a first WBEE within a time period of the silent symbol at a first bandwidth, the time period of the silent symbol being associated with no expected data transmission. The first WBEE may be measured or detected at the first bandwidth for the time duration within the time period of the silent symbol. For example, the wireless device may determine a first WBEE of a symbol at a first bandwidth, the symbol associated with no expected C-V2X transmissions. For example, the wireless device may take the energy measurements after the ADC using WBEE before demodulation over TBD accumulated time (for example, 20 µs) allocated for C-V2X 10 MHz BW. For example, at 1014, the wireless device 1002 may measure or detect a first WBEE within a time period of the silent symbol at a first bandwidth, the time period of the silent symbol being associated with no expected data transmission. Furthermore, 1208 may be performed by the WBEE component 1340.

At 1210, the wireless device may measure or detect a second WBEE at a second bandwidth within the time period of the silent symbol subsequent to the first WBEE, the second bandwidth being different from the first bandwidth. In one aspect, the second bandwidth may be a multiple of the first bandwidth. The second WBEE may be measured or detected at the second bandwidth for the time duration within the time period of the silent symbol. For example, the wireless device may determine a second WBEE of the symbol at a second bandwidth, the symbol associated with no expected C-V2X transmissions. For example, the wireless device may switch to the 20 MHz BW, take the WBEE over the following accumulated time (for example, 20 µs), and save it as WBEE-20 MHz. For example, at 1016, the wireless device 1002 may measure or detect a second WBEE at a second bandwidth within the time period of the silent symbol subsequent to the first WBEE, the second bandwidth being different from the first bandwidth. Furthermore, 1210 may be performed by the WBEE component 1340.

At 1220, the wireless device may identify an interference in the time period of the silent symbol based on the first WBEE and the second WBEE. The interference may be associated with a jammer or a signal jamming device. The interference may be identified based on a WBEE ratio of the second WBEE to the first WBEE being greater than a bandwidth ratio of the second bandwidth to the first bandwidth. Furthermore, a threshold value may be configured, and the wireless device may identify the interference based on the WBEE ratio of the second WBEE to the first WBEE being greater than a bandwidth ratio of the second bandwidth to the first bandwidth by a threshold value. For example, the wireless device may identify an interference based on the first WBEE and the second WBEE. For example, the wireless device may calculate the ratio of the WBEE-20 MHz to the WBEE-10 MHz (i.e., WBEE-20 MHz/WBEE-10 MHz) and identify the interference based on the ratio is substantially greater than 2. Here, the ratio substantially greater than 2 may refer to a value greater than 2 with the threshold value (i.e., 2+threshold value). For example, at 1024, the wireless device 1002 may identify an interference in the time period of the silent symbol based on the first WBEE and the second WBEE. Furthermore, 1220 may be performed by an interference identifying component 1346.

Figure 13:
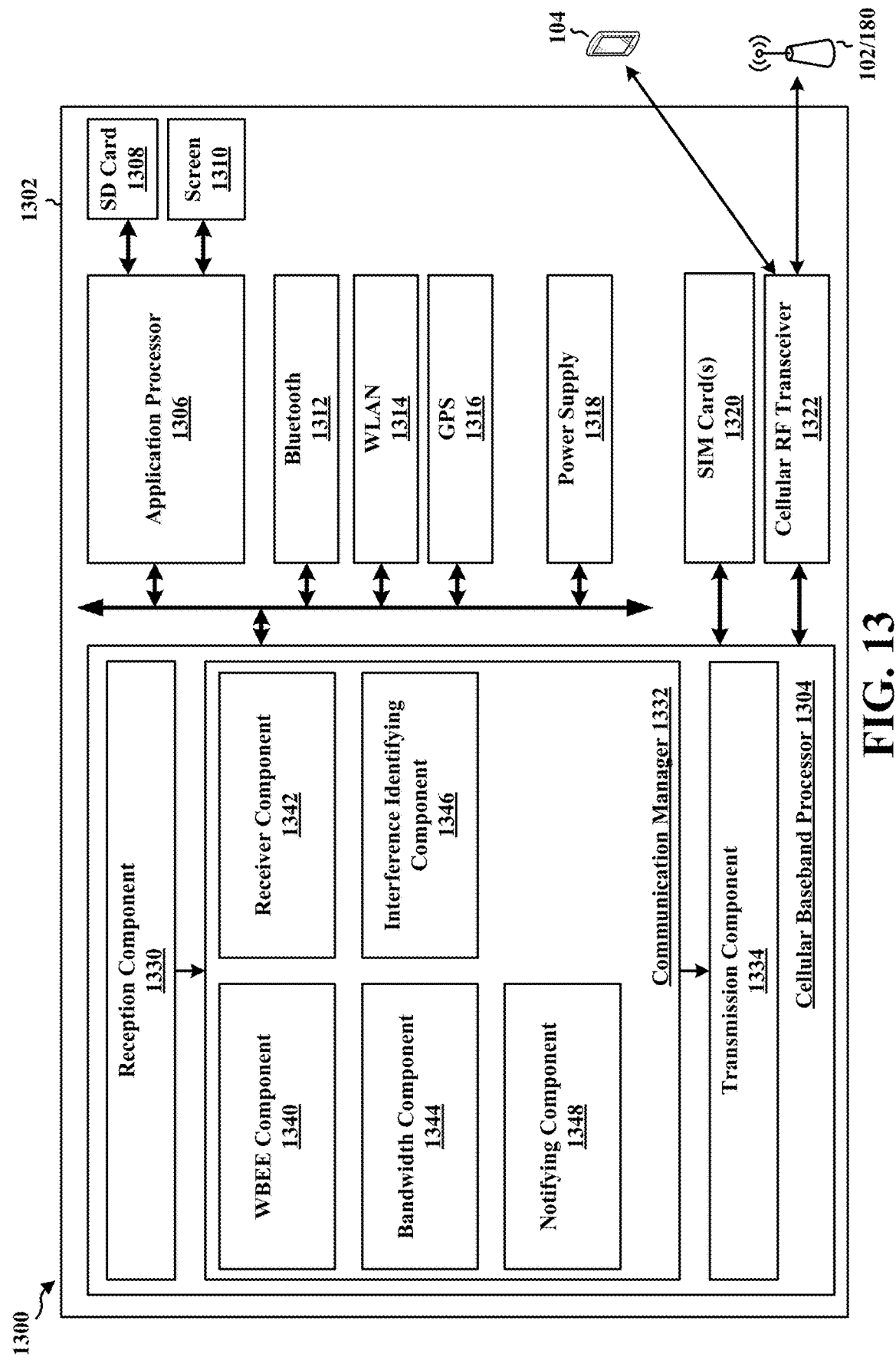
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a WBEE component 1340 that is configured to configure the first WBEE within the time period of the silent symbol at the first bandwidth, configure the second WBEE within the time period of the silent symbol at the second bandwidth subsequent to the first WBEE, measure or detect a first WBEE within a time period of the silent symbol at a first bandwidth, the time period of the silent symbol being associated with no expected data transmission, measure or detect a second WBEE at a second bandwidth within the time period of the silent symbol subsequent to the first WBEE, the second bandwidth being different from the first bandwidth, measure a WBEE ratio of the second WBEE to the first WBEE. Here, the WBEE ratio may refer to the ratio of the second WBEE to the first WBEE ($WBEE_2/WBEE_1$), and measure or detect at least one third WBEE within the time period of the silent symbol at a third bandwidth based on the measured WBEE ratio of the second WBEE to the first WBEE, e.g., as described in connection with 1102, 1104, 1108, 1110, 1112, 1114, 1208, and 1210. The communication manager 1332 further includes a receiver component 1342 that is configured to activate and deactivate the receiver of the wireless device based on identifying the interference in the time period of the silent symbol based on the first WBEE and the second WBEE, e.g., as described in connection with 1106 and 1124. The communication manager 1332 further includes a bandwidth component 1344 that is configured to select two bandwidths from the first bandwidth, the second bandwidth, and the third bandwidth, and switch from the first bandwidth or the second bandwidth to the third bandwidth based on the third bandwidth being selected, e.g., as described in connection with 1116 and 1118. The communication manager 1332 further includes an interference identifying component 1346 that is configured to identify an interference in the time period of the silent symbol based on the first WBEE and the second WBEE, e.g., as described in connection with 1120 and 1220. The communication manager 1332 further includes a notifying component 1348 that is configured to notify an operator of the wireless device of the identified interference, e.g., as described in connection with 1122.

The apparatus may include additional components that perform each of the blocks of the algorithm in the flowcharts of FIGS. 10, 11, and 12. As such, each block in the flowcharts of FIGS. 10, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for measuring or detecting a first WBEE within a time period of the silent symbol at a first bandwidth, the time period of the silent symbol being associated with no expected data transmission, means for measuring or detecting a second WBEE at a second bandwidth within the time period of the silent symbol subsequent to the first WBEE, the second bandwidth being different from the first bandwidth, and means for identifying an interference in the time period of the silent symbol based on the first WBEE and the second WBEE. The apparatus 1302 includes means for configuring the first WBEE within the time period of the silent symbol at the first bandwidth, and means for configuring the second WBEE within the time period of the silent symbol at the second bandwidth subsequent to the first WBEE. The apparatus 1302 includes means for measuring a WBEE ratio of the second WBEE to the first WBEE, and means for measuring or detecting at least one third WBEE within the time period of the silent symbol at a third bandwidth based on the measured WBEE ratio of the second WBEE to the first WBEE. The apparatus 1302 includes means for selecting two bandwidths from the first bandwidth, the second bandwidth, and the third bandwidth, and means for switching from the first bandwidth or the second bandwidth to the third bandwidth. The apparatus 1302 includes means for notifying the identified interference to an operator of the wireless device, means for activating a receiver of the wireless device within a part of the time period of the silent symbol to measure or detect the first WBEE and the second WBEE, and means for deactivating the receiver of the wireless device after identifying the interference for the rest of the time period of the silent symbol based on the first WBEE and the second WBEE. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

A method of wireless communication of a wireless device in a C-V2X connection may include: determining a WBEE of a symbol at a first bandwidth, the symbol associated with no expected C-V2X transmissions, determining a second WBEE of the symbol at a second bandwidth, and identifying an interference based on the first WBEE and the second WBEE. The method may also include notifying an operator of the wireless device of the identified interference.

In one aspect, the first bandwidth may be 10 MHz and the second bandwidth is 20 MHz, and the interference may be identified based on a ratio of the second WBEE to the first WBEE being substantially greater than 2. In another aspect, the first bandwidth may be 20 MHz and the second bandwidth may be 10 MHz, and the interference may be identified based on a ratio of the first WBEE to the second WBEE being substantially greater than 2. The symbol may be a symbol 13, and the symbol may correspond to a time period of 20 microseconds (µs).

In another aspect, the ratio of the WBEE-20 MHz bandwidth to WBEE-10 MHz when there is no jammer may be learned during manufacturing and the learned factor (which may not be exactly 2) may be fed to the wireless device 1002. The wireless device 1002 may then measure or detect the WBEE-20 MHz/WBEE-10 MHz ratio compared to the learned factor and provide jammer detector alarm in case the determined ratio is above the pre-defined value or learned factor.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to measure or detect a first WBEE within a time period of a silent symbol at a first bandwidth, the time period of the silent symbol being associated with no expected data transmission, measure or detect a second WBEE at a second bandwidth within the time period of the silent symbol subsequent to the first WBEE, the second bandwidth being different from the first bandwidth, and identify an interference in the time period of the silent symbol based on the first WBEE and the second WBEE.

Aspect 2 is the apparatus of aspect 1, where the interference is associated with a jammer or a signal jamming device.

Aspect 3 is the apparatus of any of aspects 1 and 2, where the at least one processor and the memory are further configured to configure the first WBEE within the time period of the silent symbol at the first bandwidth, and configure the second WBEE within the time period of the silent symbol at the second bandwidth subsequent to the first WBEE.

Aspect 4 is the apparatus of any of aspects 1 to 3, where the second bandwidth is a multiple of the first bandwidth.

Aspect 5 is the apparatus of aspect 4, where the at least one processor and the memory are further configured to measure a WBEE ratio of the second WBEE to the first WBEE, and measure or detect at least one third WBEE within the time period of the silent symbol at a third bandwidth based on the measured WBEE ratio of the second WBEE to the first WBEE.

Aspect 6 is the apparatus of aspect 5, where the at least one processor and the memory are further configured to select two bandwidths from the first bandwidth, the second bandwidth, and the third bandwidth.

Aspect 7 is the apparatus of aspect 6, where, based on the third bandwidth being selected, the at least one processor and the memory are further configured to switch from the first bandwidth or the second bandwidth to the third bandwidth.

Aspect 8 is the apparatus of any of aspects 4 to 7, where the interference is identified based on a WBEE ratio of the second WBEE to the first WBEE being greater than a bandwidth ratio of the second bandwidth to the first bandwidth.

Aspect 9 is the apparatus of aspect 8, where the interference is identified based on the WBEE ratio of the second WBEE to the first WBEE being greater than a bandwidth ratio of the second bandwidth to the first bandwidth by a threshold value.

Aspect 10 is the apparatus of any of aspects 4 to 9, where the second bandwidth is twice the first bandwidth, where the interference is identified based on a WBEE ratio of the second WBEE to the first WBEE being greater than the bandwidth ratio of the second bandwidth to the first bandwidth.

Aspect 11 is the apparatus of any of aspects 1 to 10, where the data transmission is a C-V2X connection.

Aspect 12 is the apparatus of aspect 11, where a last symbol within a subframe is associated with a silent mode.

Aspect 13 is the apparatus of aspect 12, where the silent symbol within the subframe is a symbol 13 of the C-V2X connection associated with the silent mode or any intermittent time that is identified with no transmission or reception within the subframe.

Aspect 14 is the apparatus of any of aspects 1 to 13, where the first WBEE is measured or detected at the first bandwidth for a time duration within the time period of the silent symbol, and the second WBEE is measured or detected at the second bandwidth for the time duration within the time period of the silent symbol.

Aspect 15 is the apparatus of any of aspects 1 to 14, where the at least one processor and the memory are further configured to notify the identified interference to an operator of the wireless device.

Aspect 16 is the apparatus of any of aspects 1 to 15, further including a transceiver coupled to the at least one processor, where the at least one processor and the memory are further configured to activate a receiver of the wireless device within a part of the time period of the silent symbol to measure or detect the first WBEE and the second WBEE, and deactivate the receiver of the wireless device after identifying the interference for the rest of the time period of the silent symbol based on the first WBEE and the second WBEE.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

What is claimed is:

1. An apparatus of wireless communication at a wireless device, comprising:
   a memory; and
   at least one processor coupled to the memory, the at least one processor and the memory configured to:
      measure a first wide band energy estimation (WBEE) within a time period of a silent symbol at a first bandwidth, the time period of the silent symbol being associated with no expected data transmission;
      measure a second WBEE at a second bandwidth within the time period of the silent symbol subsequent to the first WBEE, the second bandwidth being different from the first bandwidth; and
      identify an interference in the time period of the silent symbol based on the first WBEE, the second WBEE, and a WBEE ratio of the second WBEE to the first WBEE being greater than a bandwidth ratio of the second bandwidth to the first bandwith.

2. The apparatus of claim 1, wherein the interference is associated with a jammer or a signal jamming device.

3. The apparatus of claim 1, wherein the at least one processor and the memory are further configured to:
   configure the first WBEE within the time period of the silent symbol at the first bandwidth; and
   configure the second WBEE within the time period of the silent symbol at the second bandwidth subsequent to the first WBEE.

4. The apparatus of claim 1, wherein the second bandwidth is a multiple of the first bandwidth.

5. The apparatus of claim 4, wherein the at least one processor and the memory are further configured to:
   measure the WBEE ratio of the second WBEE to the first WBEE; and
   measure at least one third WBEE subsequent to the second WBEE within the time period of the silent symbol at a third bandwidth based on the measured WBEE ratio of the second WBEE to the first WBEE.

6. The apparatus of claim 5, wherein the at least one processor and the memory are further configured to:
   select two bandwidths from the first bandwidth, the second bandwidth, and the third bandwidth.

7. The apparatus of claim 6, wherein, based on the third bandwidth being selected, the at least one processor and the memory are further configured to: switch from the first bandwidth or the second bandwidth to the third bandwidth.

8. The apparatus of claim 1, wherein to identify the interference, the at least one processor and the memory are configured to identify the interference based on the WBEE ratio of the second WBEE to the first WBEE being greater than the bandwidth ratio of the second bandwidth to the first bandwidth by a threshold value.

9. The apparatus of claim 4, wherein the second bandwidth is twice the first bandwidth,
   wherein to identify the interference, the at least one processor and the memory are configured to identify the interference based on the WBEE ratio of the second WBEE to the first WBEE being greater than the bandwidth ratio of the second bandwidth to the first bandwidth.

10. The apparatus of claim 1, wherein the data transmission is a cellular vehicle-to-everything (V2X) (C-V2X) connection.

11. The apparatus of claim 10, wherein a last symbol within a subframe is associated with a silent mode.

12. The apparatus of claim 11, wherein the silent symbol within the subframe is a symbol 13 of the C-V2X connection associated with the silent mode or any intermittent time that is identified with no transmission or reception within the subframe.

13. The apparatus of claim 1, wherein to measure the first WBEE, the at least one processor and the memory are configured to measure the first WBEE at the first bandwidth for a time duration within the time period of the silent symbol, and wherein to measure the second WBEE, the at least one processor and the memory are configured to measure the second WBEE at the second bandwidth for the time duration within the time period of the silent symbol.

14. The apparatus of claim 1, wherein the at least one processor and the memory are further configured to notify the identified interference to an operator of the wireless device.

15. The apparatus of claim 1, further comprising a transceiver coupled to the at least one processor,
   wherein the at least one processor and the memory are further configured to:
      activate a receiver of the wireless device within a part of the time period of the silent symbol to measure the first WBEE and the second WBEE; and
      deactivate the receiver of the wireless device after identifying the interference for the rest of the time period of the silent symbol based on the first WBEE and the second WBEE.

16. A method of wireless communication at a wireless device, comprising:
   measuring a first wide band energy estimation (WBEE) within a time period of a silent symbol at a first bandwidth, the time period of the silent symbol being associated with no expected data transmission;
   measuring a second WBEE at a second bandwidth within the time period of the silent symbol subsequent to the first WBEE, the second bandwidth being different from the first bandwidth; and
   identifying an interference in the time period of the silent symbol based on the first WBEE, the second WBEE, and a WBEE ratio of the second WBEE to the first WBEE being greater than a bandwidth ratio of the second bandwidth to the first bandwidth.

17. The method of claim 16, further comprising:
   configuring the first WBEE within the time period of the silent symbol at the first bandwidth; and
   configuring the second WBEE within the time period of the silent symbol at the second bandwidth subsequent to the first WBEE.

18. The method of claim 16, wherein the second bandwidth is a multiple of the first bandwidth.

19. The method of claim 18, further comprising:
measuring the WBEE ratio of the second WBEE to the first WBEE; and
measuring at least one third WBEE subsequent to the second WBEE within the time period of the silent symbol at a third bandwidth based on the measured WBEE ratio of the second WBEE to the first WBEE.

20. The method of claim 19, further comprising:
selecting two bandwidths from the first bandwidth, the second bandwidth, and the third bandwidth.

21. The method of claim 20, further comprising:
switching from the first bandwidth or the second bandwidth to the third bandwidth based on the third bandwidth being selected.

22. The method of claim 16, wherein the data transmission is a cellular vehicle-to-everything (V2X) (C-V2X) connection.

23. The method of claim 22, wherein a last symbol within a subframe is associated with a silent mode.

24. The method of claim 16, wherein the first WBEE is measured at the first bandwidth for a time duration within the time period of the silent symbol, and the second WBEE is measured at the second bandwidth for the time duration within the time period of the silent symbol.

25. The method of claim 16, further comprising:
notifying the identified interference to an operator of the wireless device.

26. The method of claim 16, further comprising:
activating a receiver of the wireless device within a part of the time period of the silent symbol to measure the first WBEE; and
deactivating the receiver of the wireless device after identifying the interference for the rest of the time period of the silent symbol based on the first WBEE and the second WBEE.

27. An apparatus for wireless communication at a wireless device, comprising:
means for measuring a first wide band energy estimation (WBEE) within a time period of a silent symbol at a first bandwidth, the time period of the silent symbol being associated with no expected data transmission;
means for measuring a second WBEE at a second bandwidth within the time period of the silent symbol subsequent to the first WBEE, the second bandwidth being different from the first bandwidth; and
means for identifying an interference in the time period of the silent symbol based on the first WBEE, the second WBEE, and a WBEE ratio of the second WBEE to the first WBEE being greater than a bandwidth ratio of the second bandwith to the first bandwith.

28. A non-transitory computer-readable medium storing computer executable code at a wireless device, the code when executed by a processor causes the processor to:
measure a first wide band energy estimation (WBEE) within a time period of a silent symbol at a first bandwidth, the time period of the silent symbol being associated with no expected data transmission;
measure a second WBEE at a second bandwidth within the time period of the silent symbol subsequent to the first WBEE, the second bandwidth being different from the first bandwidth; and
identify an interference in the time period of the silent symbol based on the first WBEE, the second WBEE, and a WBEE ratio of the second WBEE to the first WBEE being greater than a bandwidth ratio of the second bandwidth to the first bandwidth.

* * * * *